US008856751B2

(12) United States Patent
Li et al.

(10) Patent No.: US 8,856,751 B2
(45) Date of Patent: Oct. 7, 2014

(54) ABSTRACT SYMBOLIC EXECUTION FOR SCALING SYMBOLIC EXECUTION GENERATION AND AUTOMATIC TEST GENERATION

(71) Applicant: Fujistu Limited, Kanagawa (JP)

(72) Inventors: Guodong Li, San Jose, CA (US); Indradeep Ghosh, Cupertino, CA (US); Sreeranga Rajan, Sunnyvale, CA (US)

(73) Assignee: Fujitsu Limited, Kawasaki-shi (JP)

( * ) Notice: Subject to any disclaimer, the term of this patent is extended or adjusted under 35 U.S.C. 154(b) by 196 days.

(21) Appl. No.: 13/623,478

(22) Filed: Sep. 20, 2012

(65) Prior Publication Data
US 2014/0082594 A1 Mar. 20, 2014

(51) Int. Cl.
G06F 9/44 (2006.01)
G06F 11/36 (2006.01)

(52) U.S. Cl.
CPC .................................. *G06F 11/3604* (2013.01)
USPC .......................................................... 717/126

(58) Field of Classification Search
CPC .................................................. G06F 11/3604
USPC .......................................................... 717/126
See application file for complete search history.

(56) References Cited

U.S. PATENT DOCUMENTS

| 5,784,553 | A * | 7/1998 | Kolawa et al. ................ 714/38.1 |
| 8,402,440 | B2 * | 3/2013 | Sankaranarayanan et al. ............................ 717/126 |
| 8,479,171 | B2 * | 7/2013 | Ghosh ........................... 717/131 |
| 8,595,701 | B2 * | 11/2013 | Li et al. ........................... 717/124 |
| 2009/0282289 | A1 * | 11/2009 | Nori et al. ........................ 714/38 |
| 2012/0192150 | A1 * | 7/2012 | Li et al. ........................... 717/118 |
| 2012/0192169 | A1 * | 7/2012 | Li et al. ........................... 717/161 |
| 2012/0204154 | A1 * | 8/2012 | Li et al. ........................... 717/124 |
| 2012/0311545 | A1 * | 12/2012 | Li et al. ........................... 717/132 |
| 2013/0318503 | A1 * | 11/2013 | Li et al. ........................... 717/126 |
| 2013/0326485 | A1 * | 12/2013 | Ghosh et al. .................. 717/126 |
| 2014/0047217 | A1 * | 2/2014 | Li et al. ........................... 712/216 |

OTHER PUBLICATIONS

Tinelli, Cesare; "An abstract framework for satisfiability modulo theories"; TABLEAUX. vol. 4548. 2007.*
Zhang, Jianmin, et al. "Extracting minimal unsatisfiable subformulas in satisfiability modulo theories." Computer Science and Information Systems 8.3 (2011): 693-710.*
Arcaini, Paolo, et al. "Optimizing the automatic test generation by SAT and SMT solving for Boolean expressions." Proceedings of the 2011 26th IEEE/ACM International Conference on Automated Software Engineering. IEEE Computer Society, 2011.*

(Continued)

*Primary Examiner* — Qing Chen
*Assistant Examiner* — Clint A Thatcher
(74) *Attorney, Agent, or Firm* — Baker Botts L.L.P.

(57) ABSTRACT

A method includes, by one or more computing devices, determining code-under-test configured for execution on a computing device to be evaluated, creating a plurality of test cases based on the symbolic execution and including a plurality of constraints, selectively conducting abstract interpretation on the constraints, selectively conducting Satisfiability Modulo Theory ("SMT") solving on the constraints, and validating or invalidating the code-under-test based on at least the SMT solving and the abstract interpretation. The abstract interpretation includes using a plurality of abstract interpretation models based on the constraints of the test case and over-approximating the constraints of the test case.

20 Claims, 10 Drawing Sheets

(56) References Cited

OTHER PUBLICATIONS

Li, Guodong, et al.; "Klover: A symbolic execution and automatic test generation tool for C++ programs"; Computer Aided Verification; Springer Berlin Heidelberg, 2011.*

Godefroid, Patrice, et al.; "DART: directed automated random testing"; ACM Sigplan Notices. vol. 40. No. 6. ACM, 2005.*

De Moura, Leonardo, et al.; "Satisfiability modulo theories: introduction and applications"; Communications of the ACM 54.9 (2011): 69-77.*

Rushby, John; "Automated test generation and verified software;" Verified Software: Theories, Tools, Experiments; Springer Berlin Heidelberg, 2008; 161-172.*

* cited by examiner

| Node | Path/Conditions | Depth | Leaf Node? |
|---|---|---|---|
| 204: | C1 | 1 | |
| 206: | C1 C2 | 2 | |
| 208: | C1 ~C2 | 2 | |
| 210: | C1 C2 C3 | 3 | |
| 212: | C1 ~C2 C8 | 3 | |
| 214: | C1 C2 C3 C4 | 4 | |
| 216: | C1 C2 C3 ~C4 | 4 | |
| 218: | C1 ~C2 C8 C9 | 4 | ✓ |
| 220: | C1 ~C2 C8 ~C9 | 4 | |
| 222: | C1 C2 C3 C4 C5 | 5 | |
| 224: | C1 C2 C3 C4 ~C5 | 5 | ✓ |
| 226: | C1 C2 C3 ~C4 C7 | 5 | ✓ |
| 228: | C1 C2 C3 ~C4 ~C7 | 5 | ✓ |
| 230: | C1 ~C2 C8 ~C9 C10 | 5 | |
| 232: | C1 ~C2 C8 ~C9 ~C10 | 5 | ✓ |
| 234: | C1 C2 C3 C4 C5 C6 | 6 | ✓ |
| 236: | C1 C2 C3 C4 C5 ~C6 | 6 | ✓ |
| 238: | C1 ~C2 C8 ~C9 C10 C11 | 6 | ✓ |

| SUBTREE | Path/Conditions |
|---|---|
| 240: | ~C1 ... |
| 242: | C1 C2 ~C3 ... |
| 244: | C1 ~C2 ~C8 ... |
| 246: | C1 ~C2 C8 ~C9 C10 ~C11 ... |

US 8,856,751 B2

ABSTRACT SYMBOLIC EXECUTION FOR SCALING SYMBOLIC EXECUTION GENERATION AND AUTOMATIC TEST GENERATION

TECHNICAL FIELD

The present invention generally relates to software verification and, more particularly, to abstract symbolic execution for scaling symbolic execution generation and automatic test generation.

BACKGROUND

A software application may include any number of modules (e.g., classes, functions, procedures, subroutines, or code blocks), and each module may be tested or validated individually. A software module may be tested or validated manually or automatically. In the former case, a person (e.g., a software testing engineer) may manually design test cases for the software module based on the design specification of the module, execute the module under the test cases, and check for module behavior or output that does not agree with the specification over the test cases. In the latter case, a software-testing tool, implemented as computer software or hardware, may automatically generate test cases for a software module under test, execute the module under test while simulating the test cases, and check for module behavior or output that does not agree with the test cases. The sheer complexity of modern software often renders manual generation or design of test cases inadequate for completely testing the software.

SUMMARY

In one embodiment, a method includes, by one or more computing devices, determining code-under-test configured for execution on a computing device to be evaluated, creating a plurality of test cases based on the symbolic execution and including a plurality of constraints, selectively conducting abstract interpretation on at least one of the constraints, selectively conducting Satisfiability Modulo Theory ("SMT") solving on at least of the constraints, and validating or invalidating the code-under-test based on at least the SMT solving and the abstract interpretation. The abstract interpretation includes using a plurality of abstract interpretation models based on the constraints of the test case and over-approximating the constraints of the test case.

In another embodiment, a system includes a computer-readable medium including computer-executable instructions and one or more processors coupled to the computer-readable medium and operable to read and execute the instructions. The one or more processors are operable when executing the instructions to determine code-under-test configured for execution on a computing device to be evaluated, symbolically execute the code-under-test, create a plurality of test cases based on the symbolic execution and including a plurality of constraints, selectively conduct abstract interpretation on at least one of the constraints, selectively conduct SMT solving on at least one of the constraints, and validate or invalidate the code-under-test based on at least the SMT solving and the abstract interpretation. The abstract interpretation includes using a plurality of abstract interpretation models based on the constraints of the test case and over-approximating the constraints of the test case.

In yet another embodiment, an article of manufacture includes a computer-readable medium and computer-executable instructions carried on the computer-readable medium. The instructions are readable by a processor. The instructions, when read and executed, cause the processor to determine code-under-test configured for execution on a computing device to be evaluated, symbolically execute the code-under-test, create a plurality of test cases based on the symbolic execution and including a plurality of constraints, selectively conduct abstract interpretation on at least one of the constraints, selectively conduct SMT solving on at least one of the constraints, and validate or invalidate the code-under-test based on at least the SMT solving and the abstract interpretation. The abstract interpretation includes using a plurality of abstract interpretation models based on the constraints of the test case and over-approximating the constraints of the test case.

The object and advantages of the invention will be realized and achieved by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
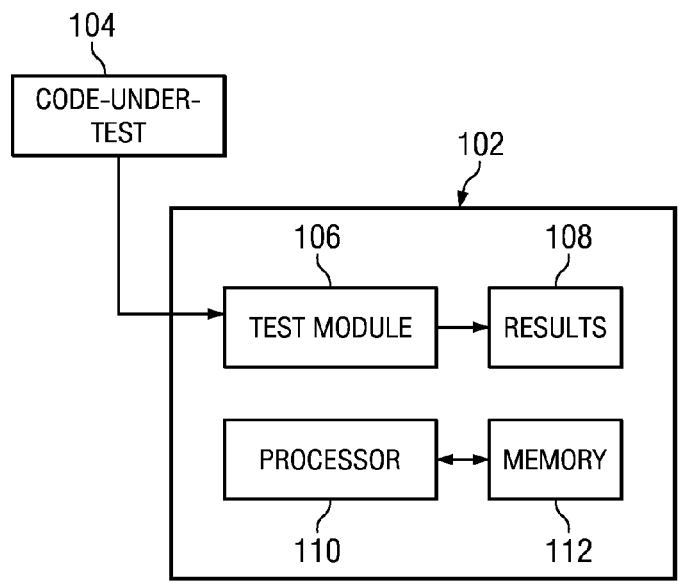
FIG. 1 is an illustration of an example embodiment of a system for abstract symbolic execution configured to scale symbolic execution and automatic test generation.

FIG. 1 is an illustration of an example embodiment of a system 100 for abstract symbolic execution configured to scale symbolic execution and automatic test generation. System 100 may be configured to verify, validate, or otherwise test code-under-test 104 and produce results 108 from such tests. During such tests, system 100 may be configured to symbolically execute code-under-test 104 and automatically generate test cases resulting from the symbolic execution. System 100 may be configured to selectively apply abstract interpretation or analysis based on Satisfiability Modulo Theory ("SMT") at different points within the symbolic execution. Further, system 100 may be configured to selectively apply multiple types of abstract interpretation at different points within the symbolic execution, or to apply multiple types of abstract interpretation in combination at a given point within the symbolic execution. In addition, at a given point within the symbolic execution system 100 may be configured to selectively apply one or more types of abstract interpretation in combination with SMT analysis. System 100 may be configured to evaluate test cases in order to validate different paths of execution of code-under-test 104 discovered during symbolic execution.

System 100 may include an electronic device 102 configured to symbolically execute one or more portions of code-under-test 104. Further, electronic device 102 may be configured to automatically generate test cases resulting from the symbolic execution. In one embodiment, electronic device 102 may be configured to evaluate the resulting test cases to validate code-under-test 104. Electronic device 102 may be configured to produce results 108 reflecting the results of testing code-under-test 104.

Electronic device 102 may be configured to receive code-under-test 104 in any suitable way such as, for example, electronically over a network, through loading or entering by a user, or accessing local or remote storage. Electronic device 102 may be configured to provide results 108 in any suitable way such as, for example, sending results 108 over a network, display to a user, or storing to a local or remote storage.

Electronic device 102 may include a test module 106 configured to perform any aspect of testing code-under-test 104 for electronic device 102 or system 100, such as symbolically executing the one or more portions of code-under-test 104, automatically generating resulting test cases, or evaluating the resulting test cases. During symbolic execution, test module 106 may be configured to selectively apply SMT analysis, abstract interpretation analysis, or a combination of both at a given point in the symbolic execution of code-under-test 104. Such a selection may consider, for example, the relationship of the point of execution within a symbolic execution tree, the variable that is being symbolically executed, the complexity of the symbolic expression, the time spent on symbolic execution, profiling information collected during the execution, the use of the variable at the given point of symbolic execution, or any other suitable criteria. Abstract interpretation may enable test module 106 to analyze a branch of execution in a relatively fast manner. However, each sub-branch, path, or constraint involved in the branch of execution may not be analyzed completely and precisely. SMT analysis may enable test module 106 to exhaustively analyze a branch of execution, such that every possible outcome may be determined precisely. However, such analysis may be resource intensive and slow. Consequently, test module 106 may employ a combination of SMT and abstract interpretation for symbolic execution of code-under-test 104. Further, test module 106 may employ different, specific combinations depending upon the portion of code-under-test 104 being evaluated.

Test module 106 may be implemented by any suitable mechanism, such as a program, software, software-as-service, analog or digital circuitry, or any combination thereof. Test module 106 may be resident on electronic device 102. Test module 106 may be implemented as a complete module, or as a sub-module as part of a larger system. In software form, some or all of test module 106 may be implemented by, for example, logic, instructions, binaries, object code, libraries, functions, programs, applications, scripts, executables, or other suitable digital entity.

Electronic device 102 may include any device configurable to interpret and/or execute program instructions and/or process data, including but not limited to: a computer, desktop, server, laptop, personal data assistant, or smartphone. Electronic device 102 may include a processor 110 coupled to a memory 112. Some or all of test module 106 may be embodied in logic or instructions resident in memory 112 for execution by processor 110. Processor 110 may include, for example, a microprocessor, microcontroller, digital signal processor (DSP), application specific integrated circuit (ASIC), or any other digital or analog circuitry configured to interpret and/or execute program instructions and/or process data. Processor 110 may interpret and/or execute program instructions and/or process data stored in memory 112. Memory 112 may comprise any system, device, or apparatus configured to retain program instructions and/or data for a period of time (e.g., computer-readable media).

Code-under-test 104 may include, for example, a hypertext-markup-language ("HTML") web page or file, software, software code, libraries, applications, scripts, active or passive web content, or other logic or instructions for execution upon an electronic device. Code-under-test 104 may include a complete instance or a portion of such software.

Using symbolic execution, test module 106 may be configured to validate code-under-test 104 in any suitable way. Test module 106 may symbolically execute code-under-test 104 to determine programming bugs, assertion violations, functional correctness, security violations, or any other indications of valid operation or errors. For example, test module 106 may evaluate whether code-under-test 104 can be executed in a manner consistent with design constraints and acceptable operating parameters. In another example, test module 106 may evaluate whether some portions of code-under-test 104 may never be executed at all or executed in escapable loops. The determined status may be stored or reported in results 108.

Results 108 may be implemented by data, files, or any other suitable mechanism for portraying, storing, or otherwise indicating the result of the operation of test module 106. Results 108 may include, for example, test cases generated by test module 106 through symbolic execution of code-under-test 104 or indications of validation or errors in code-under-test 104 determined by evaluating the test cases.

In operation, test module 106 may be executing on electronic device 102. Test module 106 may be accessible to local or remote users. Code-under-test 104 may be provided to electronic device 102 and test module 106. Test module 106 may analyze code-under-test 104 by any suitable process such as symbolically executing code-under-test 104 by selectively using abstract interpretation and SMT analysis. Depending upon factors such as position within an execution tree or type of expression or condition to be evaluated, test module 106 may selectively apply abstract interpretation, SMT analysis, or a combination of both. Test module 106 may generate test cases as a result of the symbolic execution. In one embodiment, test module 106 may analyze the test cases to determine whether the test cases indicate code-under-test 104 contains errors or is valid. Test module 106 may produce results 108, containing, for example, the generated test cases or the results of analyzing the test cases. Results 108 may be provided to a user, stored, or otherwise used to evaluate code-under-test 104.

Figure 2:
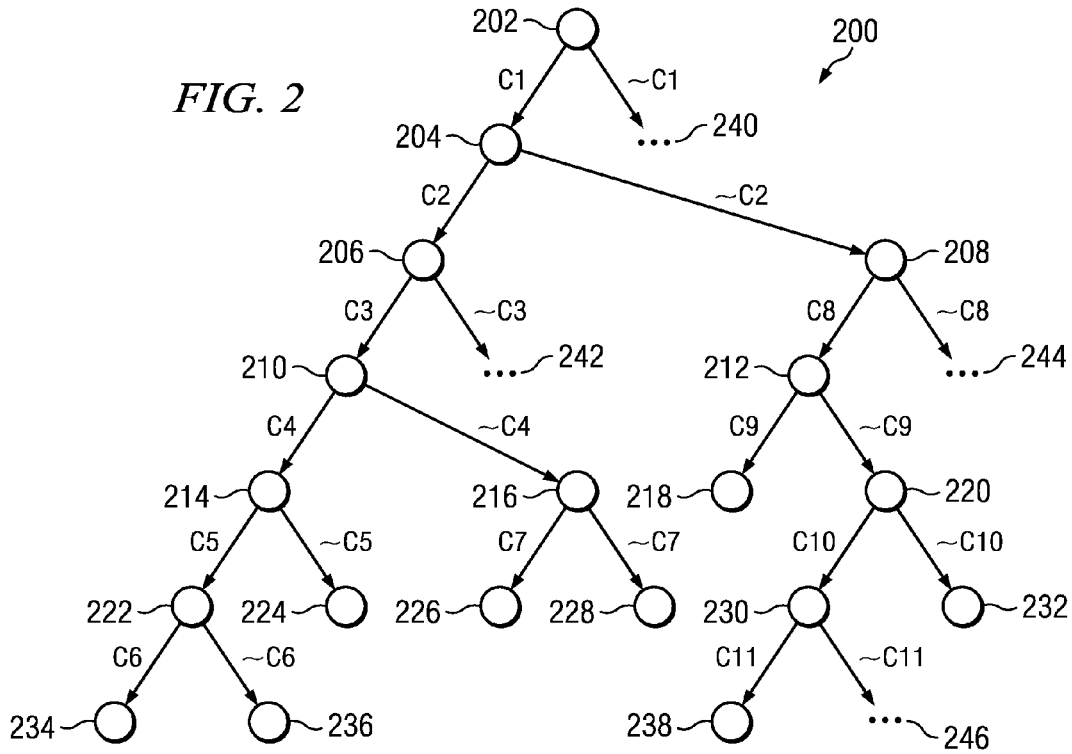
FIG. 2 is an illustration of an execution tree representing a sequence of symbolic execution conducted by a test module on code-under-test.

FIG. 2 is an illustration of an execution tree 200 representing a sequence of symbolic execution conducted by test module 106 on code-under-test 104. During symbolic execution, test module 106 may be configured to symbolically execute code-under-test 104 and determine possible execution paths of code-under-test 104.

The various branches in execution paths of code-under-test 104 may be created by various conditional operations or execution branches in code-under-test 104 such as if-then-else statements or execution loops. An encounter with a conditional operation at an execution point in code-under-test 104 may be represented by a node in execution tree 200, with the potentially resulting execution paths shown as branches from the node.

For example, execution tree 200 includes nodes 202, 204, 206, 208, 210, 212, 214, 216, 218, 220, 222, 224, 226, 228, 230, 232, 234, 236, 238. Beginning at node 202, representing a point in code-under-test 104 in which a conditional operation has been reached, execution of code-under-test 104 may proceed in one of two or more branches of code-under-test 104. Although each of the nodes in execution tree 200 is shown with two mutually exclusive branches, any suitable number of branches may be present at a given node.

Node 202 may represent a point in which a conditional operation has been reached to determine whether a particular condition such as c1 is present. The condition may involve any number of variables, parameters, or values in code-under-test 104. Based on the evaluation of c1, code-under-test 104 may proceed down one of the branches below node 202. While any number of such branches is possible, in the example of FIG. 2 two execution paths are available from node 202: c1, wherein the condition c1 was found to be true; and ~c1 wherein the condition c1 was not found to be true. In other cases, for example, branches may exist for a plurality of conditions, with one condition designated as an "else" case wherein any of the other conditions are not true. The basis of the condition may be any suitable operation, such as comparisons or loops upon strings, characters, Booleans, integers, floating-point numbers, arrays, or other structures built upon such types.

While a certain number of nodes are shown in execution tree 200, some branches of execution are abbreviated and shown as sub-trees, such as sub-trees 240, 242, 244. Each such sub-tree 240, 242, 244 may continue indefinitely. The representation of sub-trees in execution tree 200 may reflect portions of the execution of code-under-test 104 that are not material or that have not yet been evaluated.

The path from a given node assumes a given outcome of the condition. Subsequently, all nodes or other execution tree 200 elements below the node may assume the condition. For example, execution at node 202 may branch into two possible execution branches, leading to node 204 and sub-tree 240, respectively. Node 240, and its progeny, may progress with the information that condition c1 occurred in order to enable code-under-test 104 to reach that execution point. Elements within sub-tree 240 may progress with the information that condition c1 did not occur in order to enable code-under-test 104 to reach its respective execution point.

During the execution of a given node, other code not involving a conditional operation may be executed. Constraints or conditions may be created during the execution of the node. The constraints or conditions may be used in an evaluation of the node. Further, the constraints or conditions may be passed to its child branches for use in evaluation of nodes further down the execution tree 200. For example, during or prior to the execution of node 204, a string variable s may have been assigned a value of "ABCD". Thus, for the possible child nodes of node 204, including node 206 and node 208 and their respective progeny, symbolic execution of code-under-test 204 may be made with the knowledge that string variable s has the value "ABCD". A later condition, such as condition c4, may make use of such a value.

Although not shown in the example of execution tree 200, the branches of execution tree 200 may loop-back to an earlier portion of execution tree 200. Such a branching operation may reflect, for example, a loop operation. In some cases, execution tree 200 may generate a new sub-tree instead of simply looping back to the previous node. Further, although not shown in the example of execution tree 200, the branches of execution tree 200 may converge. Such a branching operation may reflect, for example, a conditional operation that is merely added to other operations, but does not change the other operations. For example, code-under-test may include the statements:

```
int absolute_difference (int x, int y) {
    if (x < 0) then (x = 0 - x);
    if (y < 0) then (y = 0 - y);
    if (y > x)
        then return (y - x)
        else return (x - y);
}
```

In such an example configured to calculate the difference between the absolute values of two integers, x and y, the conditional operation (x<0) may generate two child nodes, one corresponding to (x<0) and one corresponding to (x>=0). However, after executing the assignment of (x=0−x) the child node corresponding to (x<0) may converge to the child node corresponding to (x>=0). This is because the child node corresponding to (x>=0) may be subsequently executed after the existence of either condition. Accordingly, execution tree 200 may reflect such a sequence.

Any given node or sub-tree of execution tree 200 may be reached by a sequence of operations yielding a path to the node or sub-tree. Associated with the node or sub-tree may be a set of conditions, constraints, or other criteria by which the node or sub-tree was reached. These may reflect the conditions (c1, ~c1, c2, etc.) derived from the explicit conditional operations at a given node giving way to a choice in branches. Further, as described above these may also include other constraints determined from the execution of non-conditional operations, such as assignment of values to variables. Accordingly, FIG. 2 illustrates a table of the paths and conditions for a given node or sub-tree. For example, upon the execution of node 238, the conditions c1, ~c2, c8, ~c9, c10, and c11 may have been determined.

Test module 106 may create test cases based on the conditions and constraints for code-under-test 104 for a given point of execution within execution tree 200. These test cases may include, for example, the conditions and constraints determined from initial design parameters of code-under-test 104 as well as the conditions and constraints determined during symbolic execution as described above. Further, the test cases may include additional conditions and constraints inferred or deduced from the determined conditions and constraints. The test cases may be defined in terms of various underlying data types, such as ranges or acceptable values of Booleans, characters, strings, numbers, arrays, or other structures using such types.

If the test cases are solvable, or satisfiable, wherein a solution may exist to satisfy all the constraints encountered on a given execution path, then test module 106 may validate code-under-test 104 as to the execution path and the known constraints. Upon determination of additional constraints, a given execution path may be reanalyzed. Further, if such test cases are not solvable, or are unsatisfiable, wherein no solution exists to satisfy all the constraints encountered on a given execution path, then test module 106 may determine that an error, bug, security violation, or other problem exists in code-under-test 104 as to the given execution path.

Thus, test module 106 may conduct symbolic execution to execute code-under-test 104 to various points of execution within execution tree 200, such as the nodes and sub-trees contained therein. Further, test module 106 may generate test cases corresponding to the various nodes and sub-trees. In addition, test module 106 may analyze code-under-test 104 by determining whether the test cases at the various nodes and sub-trees are solvable.

In order to evaluate a given node or sub-tree in execution tree 200, test module 106 may selectively use a combination of SMT-based and abstract interpretation-based analysis.

SMT-based analysis may be completely thorough, exploring and considering all constraints and conditions for a given test case to definitively determine whether or not the sets of constraints and conditions are solvable. False positives, wherein a set is incorrectly determined to be solvable, are prevented. However, SMT-based analysis may be resource intensive. Many heuristic functions may be required for its operation. A majority of processing effort for a given symbolic execution application may be devoted to SMT-based analysis.

Abstract interpretation may be used for static applications. However, its application to a dynamic environment such as symbolic execution may be limited. Abstract interpretation may include several mathematical characterizations of possible values of variables, wherein the characterizations form a relationship. Abstract interpretation may utilize concrete semantics that describe very closely the actual execution of a program. For some elementary operations, abstract interpretation may not lose accuracy. However, for many practical uses of abstract interpretation on code-under-test 104, abstract interpretation may include over-approximations of possible values. For example, given the instructions:

```
foo (int a, int b) {
    if ((a * b) > = 0)
        return a
    else if ((a + b) >= 0)
        return b
    else return (a+b);}
```

Test module 106 may use abstract interpretation to keep track the signs of input parameters a and b. Thus, while the evaluation of ((a*b)>=0) may lose no accuracy, the evaluation of ((a+b)>=0) may not be possible.

Yet, for a given set of constraints, abstract interpretation may be able to provide an over-approximated answer very quickly as compared to SMT analysis. Test module 106 may use abstract interpretation to quickly analyze a given node or sub-tree in execution tree 200 to determine whether the conditions and constraints contained there are unsolvable. However, test module 106 may produce a false-positive because of the approximate nature of abstract interpretation, leading test module 106 to assume that the conditions and constraints of a given node or sub-tree 106 is solvable when they are not. The choice of a particular kind of abstract interpretation may yield slower computation and greater accuracy, versus faster computation and lower accuracy for another kind of abstract interpretation. Possible choices of abstract interpretation domains are discussed in more detail in conjunction with, for example, FIGS. 7 and 8.

Consequently, test module 106 may selectively use SMT analysis in situations in execution tree 200 demanding more precise solving and use abstract analysis in situation in execution tree 200 demanding less precise solving. For a given node or sub-tree, the selection of whether to employ SMT analysis, one or more kinds abstract interpretation analysis, or a combination thereof may use any suitable criteria.

In one embodiment, test module 106 may selectively use SMT analysis on leaf nodes in execution tree 200, wherein the leaf nodes represent the end of an execution path. For example, test module 106 may employ SMT analysis to evaluate nodes 204, 218, 224, 226, 228, 232, 234, 236, 238. The consequences of a false positive analysis of a leaf node may be an undetected error. Thus, SMT analysis may be employed on all leaf nodes of execution tree 200 to guarantee the accuracy of the analysis performed by test module 106.

In another embodiment, test module 106 may selectively use SMT analysis on nodes or sub-trees in execution tree 200 where the depth of execution has reached a given criteria. For example, a depth of execution from a reference node 202 for node 230 may be five. Test module 106 may selectively use SMT analysis on node 230, even though node 230 is not a leaf node, because the depth of execution is five or greater. The sets of constraints and conditions for such a depth may begin to become sufficiently complicated so as to require even more complicated abstract interpretation. The abstract interpretation may reach a complexity nearing that of SMT and thus SMT may be used instead, given that the resource-savings are diminished. In yet another embodiment, the size, number, or type of conditions or constraints in a test case may be used to selectively determine whether to use SMT analysis or not. Such a metric may be similar in use to depth of execution in that it measures the complexity of analysis required.

In still yet another embodiment, test module 106 may selectively use SMT analysis on nodes or sub-trees in execution tree 200 wherein the node or sub-tree reflect particular operations are difficult to model with abstract interpretation. For example, loop conditions may be difficult to model with abstract interpretation and maintain accuracy and performance goals, as it may be hard to terminate the loop. Thus, on such nodes or sub-trees, test module 106 may use SMT analysis, more detailed abstract interpretation, or a combination thereof.

In another embodiment, test module 106 may employ a combination of SMT analysis and abstract interpretation. Wherein abstract interpretation may have a substantial, though not certain, chance of detecting an unsolvable set of constraints and conditions, test module 106 may first employ abstract interpretation. The relatively inexpensive cost of employing abstract interpretation, although potentially producing a false-positive validation, is outweighed by the chance to avoid expensive SMT analysis.

In another embodiment, test module 106 may selectively use abstract interpretation on nodes or sub-trees in execution tree 200 with constraints that are expressed with nonlinear expressions. Operation of test module 106 with SMT analysis for nonlinear symbolic constraints may be inefficient, undecidable—wherein no answers about satisfiability or unsatisfiability are provided within a finite time period, or in the complexity class NP-complete, wherein the time complexity is exponential to the input size. For example, operation of test module 106 with SMT analysis may have great difficulty in handling the expression "a*b>(a+b$^a$)" wherein a and b are integers or sixty-four-bit bitvectors. Depending upon the implementation of SMT analysis, such an expression may not be accepted wherein a and b are integers, or may be very slow if a and b are bitvectors. In contrast, operation of test module 106 with abstract interpretation may be able to efficiently estimate the values of a and b, even though such an estimation may not be exact. Consequently, test module 106 conducting abstract interpretation on nodes or sub-trees in execution tree 200 in lieu of SMT analysis or before such SMT analysis may prevent the need for such expensive and possibly unproductive SMT analysis.

In still yet another embodiment, for nodes or sub-trees of execution tree 200 not selected for SMT analysis, test module 106 may employ abstract interpretation. For nodes such as nodes 206, 208, 210, 212, 214, 216, 220, 222, 230 that are not leaf nodes, test module 106 may employ abstract interpretation. Further, test module 106 may employ abstract interpretation on sub-trees such as sub-trees 240, 242, 244, 246.

By analyzing a non-leaf node or sub-tree, test module 106 may preclude the symbolic execution and subsequent analysis of all elements appearing below the non-leaf node or sub-tree. For example, sub-tree 244, if fully symbolically executed, may be expanded to include a multitude of sub-nodes, branches, etc. Validation of each resulting leaf node grown from sub-tree 244 may be very time-consuming. By evaluating the conditions and constraints of a test case associated with sub-tree 244 (i.e., c1 and ~c2 and ~c8), test module 106 may be able to determine that such a test case is unsolvable, preclude the necessity of symbolically executing and analyzing sub-tree 244, and prune sub-tree 244 from execution tree 200. Further, the inability of code-under-test 104 to reach sub-tree 244 is itself a condition that may be reported in results 108. Non-leaf nodes may be referred to as intermediate nodes, wherein the nodes have progeny.

While a false-positive in a leaf node may cause test module 106 to inaccurately evaluate code-under-test 104, a false-positive in a non-leaf node or sub-tree may simply cause symbolic execution and subsequent progeny analysis of code-under-test 104 at the non-leaf node or sub-tree. The resource savings, in the aggregate, of conducting abstract interpretation, rather than SMT analysis, at such non-leaf nodes or sub-trees may outweigh the additional resource costs of symbolically executing and analyzing the progeny of the non-leaf nodes or sub-trees. Consequently, test module 106 may apply abstract interpretation by default to a given element of execution tree 200, reserving SMT analysis for elements of execution tree 200 meeting particular criteria.

Figure 3:
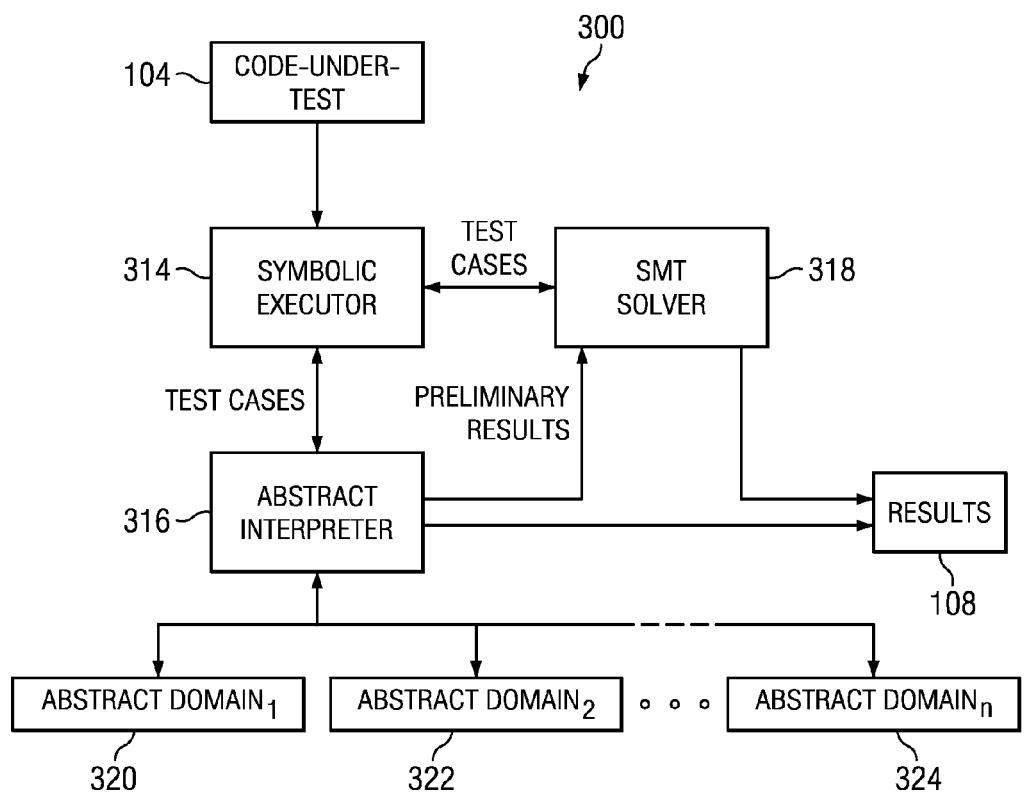
FIG. 3 is a more detailed view of an example embodiment of a test module.

FIG. 3 is a more detailed view of an example embodiment of a test module 300. Test module 300 may fully or partially implement test module 106 of FIG. 1.

Test module 300 may include a symbolic executor 314 configured to receive code-under-test 104 or a portion thereof. Symbolic executor 314 may be communicatively coupled to abstract interpreter 316 and to SMT solver 318. SMT solver 318 and abstract interpreter 316 may be communicatively coupled. Abstract interpreter 316 may be coupled to one or more abstract domain representations 320, 322, 324. Abstract interpreter 316 and SMT solver 318 may be configured to produce results 108.

Although test module 300 is shown with an abstract interpreter 316 communicatively coupled to one or more abstract domain representations 320, 322, 324, any suitable configuration may be used. For example, instead of a single interpreter configured to access multiple abstract domain representations, test module 300 include multiple abstract interpreters, each communicatively coupled to symbolic executor 314, SMT solver 318, and each other. Each such one of the multiple abstract interpreters may be configured to operate in a different abstract domain, similar to abstract domain representations 320, 322, 324.

Code-under-test 104 may contain code that is to be evaluated, tested, or validated and may be implemented in, for example, a file, record, database, or any other suitable entity. Results 108 may be, for example, displayed, transmitted, or a file, record, database, or any other suitable entity.

Symbolic executor 314, abstract interpreter 316, SMT solver 318, and abstract domain representations 320, 322, 324 may each be implemented in any suitable manner, such as a program, software, software-as-service, analog or digital circuitry, or any combination thereof. Although each of symbolic executor 314, abstract interpreter 316, SMT solver 318, and abstract domain representations 320, 322, 324 are shown as separate components, any of these may be combined with another component, shown or not shown, and still perform the functionality described herein. Symbolic executor 314, abstract interpreter 316, SMT solver 318, and abstract domain representations 320, 322, 324 may each implement some or all of test module 106 from FIG. 1 and may be configured to conduct operations associated with the execution tree of FIG. 2. Symbolic executor 314, abstract interpreter 316, SMT solver 318, and abstract domain representations 320, 322, 324 may each be implemented in common or distinct modules, and such modules may be implemented as a complete module or as sub-modules as part of a larger system. In software form, some or all of symbolic executor 314, abstract interpreter 316, SMT solver 318, and abstract domain representations 320, 322, 324 may be implemented by, for example, logic, instructions, binaries, object code, libraries, functions, programs, applications, scripts, executables, or other suitable digital entity.

In one embodiment, symbolic executor 314 may be implemented in part by the symbolic virtual machine known as KLEE. In another embodiment, symbolic executor 314 may be implemented in part by the symbolic execution and automatic test generation tool known as KLOVER from Fujitsu Labs of America. In a further embodiment, SMT solver 318 may be implemented fully or in part by the KLEE symbolic virtual machine or the KLOVER symbolic execution and automatic test generation tool. In yet another embodiment, abstract interpreter 316 and abstract domain representations 320, 322, 324 may be implemented in part the by numerical abstract domain library known as APRON. The KLEE symbolic virtual machine, KLOVER symbolic execution and automatic test generation tool, and APRON numerical abstract domain library may be adapted or modified for use within test module 300.

Symbolic executor 314 may be configured to receive code-under-test 104, or a portion thereof. Symbolic executor 314 may be configured to symbolically execute code-under-test 104 as represented in an execution tree, such as execution tree 200 in FIG. 2. Symbolic executor 314 may be configured to determine variables and other sources of information to evaluate during symbolic execution. Further, symbolic executor 314 may be configured to determine constraints and conditions from the design and operating parameters of code-under-test 104 as well as from symbolic execution of code-under-test 104. Symbolic execution of code-under-test 104 may yield constraints and conditions through variable manipulation in execution of code as well as conditions leading to a selection of an execution path. Symbolic executor 314 may be configured to determine conditional operations in code-under-test 104, represented as nodes in FIG. 2. Further, symbolic executor 314 may be configured to analyze the branching of execution into different paths from the conditional operation. For a given path, execution point, or other state in code-under-test 104—such as those represented by nodes and sub-trees in FIG. 2—symbolic executor 314 may be configured to produce a test case containing the accumulated relevant constraints and conditions.

Symbolic executor 314 may be configured to analyze the test case by accessing one or more of abstract interpreter 316 and SMT solver 318. Symbolic executor 314 may be configured to determine which of abstract interpreter 316 and SMT solver 318 to use to analyze the test case through any suitable process or mechanism. For example, for selective use of abstract interpreter 316 and SMT solver 318, symbolic executor 314 may be configured to determine: whether the associated path is a final path as represented by a leaf node in an execution tree; the type of variable being evaluated; the heuristics determined by profiling data; whether the path represents a loop operation, the availability of adequate abstract domain representations 320, 322, 324 matching the conditions and constraints of the test case; the complexity of the symbolic constraints; the presence of nonlinear expressions in the constraints; an efficiency calculation; by manual specification; or any other suitable mechanism.

A manual specification of whether to use abstract interpreter 316 or SMT solver 318 may be provided using annotation language interpretable by symbolic executor 314. The annotation may be inserted into code-under-test 104. For example, in the following code:

```
if ((AbsIntrp((a * b >= b % c) , "Octagon"))
    return a
else if (AbsIntrp((a * b >= 2 * c), "Interval")) {
    return b;
    else return (a+b);
}
```

Annotations exist for controlling the usage of abstract interpretation or SMT solving. In the first line, use of abstract interpreter 316 with an octagon domain (from abstract domains 320, 322, 324) may be selected to determine the satisfiability of the expressions "a*b>=b % c". Abstract interpreter 316 may evaluate the expression and apply parameters associated with the octagon domain. If the result is satisfiable, then the solution for a is returned. Otherwise, if the result is unsatisfiable then another expression, "a*b>=b % c" may be evaluated by abstract interpreter 316 with an interval domain. Abstract interpreter 316 may evaluate the expression and apply parameters associated with the interval. If the result is satisfiable then the b value may be returned, indicating that SMT solver 318 may be used to evaluate the same expression. Otherwise, "a+b" may be returned, indicating that result was unsatisfiable. In the above example, explicit instructions are shown for selecting abstract interpretation, while SMT analysis is conducted by default, depending upon a returned value. In other examples, explicit instructions for conducting SMT analysis may be provided.

If the test case is not associated with a final path, then symbolic executor 314 may be configured to access abstract interpreter 316 to determine if the test case is solvable. If the test case is associated with a final path, then symbolic executor 314 may be configured to access SMT solver 318 to determine if the test case is solvable. Under certain conditions, a non-final path test case determined by abstract interpreter 316 to be solvable may be sent to SMT solver 318 for additional determinations of whether the test case is solvable.

For some test cases, symbolic executor 314 may be configured to first access abstract interpreter 316 to determine if the test case is solvable before engaging the use of SMT solver 318. Such test cases may include those with difficult-to-solve or expensive-to-solve expressions, leaf nodes, nodes with a depth or number of expressions above a threshold, or other suitable criteria. If the test case is determined by abstract interpreter 316 to be unsolvable, test module 300 may forgo subsequent SMT analysis. If the test case is determined by abstract interpreter 316 to be solvable, then symbolic executor 314 may be configured to access SMT solver 318 to determine if the test case is solvable because abstract interpreter 316 is at risk for a false-positive result.

If the test case is calculated to be very resource-intensive for SMT analysis, then symbolic executor 314 may be configured to first access abstract interpreter 316 to determine if the test case is solvable. If the test case is determined by abstract interpreter 316 to be unsolvable, test module 300 may forgo subsequent SMT analysis. If the test case is determined by abstract interpreter to be solvable, then symbolic executor 314 may be configured to access SMT solver 318 to determine if the test case is solvable because abstract interpreter 316 is at risk for a false-positive result.

In cases where abstract interpreter 316 is applied before SMT solver 318 to check for satisfiability, conditions, facts, or other information known or determined by abstract interpreter 316 may be used by SMT solver 318. Such information may be passed, for example, by abstract interpreter 316 directly to SMT solver 318 or through symbolic executor 314. For example, for an expression containing variable a, if the abstract interpreter 316 using an interval abstract domain determines that the value of a is within the range [l, u] then the constraint "1<=a<=u" may be added as an extra input for SMT solver 318. With such an additional input, SMT solver 318 may find a solution or unsatisfiability condition more quickly.

Symbolic executor 314 or abstract interpreter 316 may be configured to attempt to match the test case against various abstract domain representations 320, 322, 324 and, based on the attempt, select a domain to use with abstract interpreter 316. Different domain representations 320, 322, 324 may represent different models to approximate a test case. Models that are more complex may be more accurate but may require more intensive resources to evaluate. Additional discussion of domain representations is made below in conjunction with FIGS. 7 and 8.

If abstract interpreter 316 determines that a given test case is solvable, symbolic executor 314 may be configured to select a more accurate or complex abstract domain representation 320, 322, 324 and repeat the analysis by abstract interpreter 316. Information or knowledge such as constraints gained through use of a given abstract domain representation 320, 322, 324 may be applied in a subsequent use of a different abstract domain representation. With such an additional input or constraints, subsequent operation of abstract interpreter 316 may be more efficient.

Abstract interpreter 316 may be configured to repeat the analysis of the given test case with the additional abstract domain representation.

In one embodiment, if the test case is determined to be associated with a complicated execution state, such as a loop termination detection, symbolic executor 314 may be configured to select a domain 320, 322, 324 for use by abstract interpreter 316. In a further embodiment, if abstract interpreter 316 determines that the test case is solvable, symbolic executor 314 may be configured to select a more accurate or complex abstract domain 320, 322, 324 and repeat the analysis by abstract interpreter 316. In another embodiment, abstract interpreter 316 may be configured to access SMT solver 318 instead of abstract interpreter 316 for such a case. In yet another embodiment, abstract interpreter 316 may be configured to access SMT solver 318 after abstract interpreter 316 determines that the test case state is solvable.

Abstract interpreter 316 may be configured to analyze a given test case in any suitable manner according to the selected abstract domain representation 320, 322, 324. Additional details of the operation of abstract interpreter 316 are given below in conjunction with FIGS. 5 and 6. For example, abstract interpreter 316 may be configured to use one or more instances of interval domains, octagon domains, polyhedral domains, or ellipsoid domains. The instances of the domains may be selected to closely match the test case. For a given condition in a test case, abstract interpreter 316 may be configured to apply a specific domain representation.

Abstract interpreter 316 may be configured to compare the domains of the test case to determine whether or not any solutions exist for the test case in any suitable manner. For example, abstract interpreter 316 may be configured to determine the overlap or intersection of any such domains. The comparison may be represented or evaluated graphically. If there is such overlap or intersection, then a solution for the test case may exist, and thus abstract interpreter 316 may determine that the test case is solvable for the given constraints and conditions. For example, if abstract interpreter 316 determines that the test case generated from node 216 in FIG. 2 is solvable, it is done with the constraints and conditions of the execution path c1, c2, c3 and ~c4. If abstract interpreter 316 determines that the test case is not solvable, then test module 300 may determine that the associated portion of code-under-test 104 is unreachable or has an error, bug, security violation, dead-spot, or other issue that cannot allow code-under-test 104 to be validated. Abstract interpreter 316 may provide the results to symbolic executor 314, which may cease symbolic execution of the associated sub-tree or node and its progeny. In one embodiment, if abstract interpreter 316 determines that the test case is solvable then preliminary results may be sent to symbolic executor 314 or SMT solver 318 for further analysis by SMT solver 318. In another embodiment, if abstract interpreter 316 determines that the test case is solvable then abstract interpreter 316 may select another abstract domain representation 320, 322, 324 and repeat its analysis using the new abstract domain representation. The knowledge obtained through use of one domain may be used in context of subsequent use of a different domain to accelerate processing. In yet another embodiment, if abstract interpreter 316 determines that the test case is solvable then results may be sent to symbolic executor 314, which may continue symbolically processing the associated sub-tree or node and its progeny.

SMT solver 318 may be configured to evaluate a given test case through any acceptable SMT-based analysis. Further, SMT solver 318 may be configured to receive a test case from symbolic executor 314 or abstract interpreter 316. If the test case cannot solved, the SMT solver 318 may be configured to provide the results in 108 and to inform symbolic executor 314, which may be configured to continue symbolically processing any progeny of the associated sub-tree or node. In such a case, test module 300 may be configured to validate the portion of code-under-test 104 associated with the test case. If the test case cannot be solved, then SMT solver may be configured to provide the results in 108 and to inform symbolic executor 314, which may be configured to discontinue symbolically processing any progeny of the associated sub-tree or node. In such a case, test module 300 may be configured to determine that the portion of code-under-test 104 associated with the test case is unreachable or contains an error, bug, dead-spot, security violation, or other issue that cannot allow code-under-test 104 to be validated.

Test module 300 may continue to symbolically execute code-under-test 104 until code-under-test 104 has been exhaustively evaluated or a boundary condition, such as length of time, depth of execution, number of iterations, or other criteria is met.

In operation, symbolic executor 314 may receive code-under-test 104 or a portion thereof. Symbolic executor 314 may symbolically execute code-under-test 104 to determine constraints and conditions of variables and other components of code-under-test 104. Symbolic executor 314 may determine a branch option in code-under-test 104 and symbolically execute each subsequent branch in turn. For a given state in code-under-test 104, such as that associated with a conditional operation, symbolic executor 314 may generate a test case containing relevant conditions and constraints determined through symbolic execution of code-under-test to reach the given state. Symbolic executor 314 may provide the test case to abstract interpreter 316, SMT solver 318, or a combination of both to analyze whether the test case is solvable. Symbolic executor 314 may provide the test case to such elements based on the position of the given state within the execution of code-under-test, the type of variable being evaluated, or other suitable criteria. Symbolic executor 314 may determine one or more instances of abstract domain representations 320, 322, 324 to be used by abstract interpreter 316. Abstract interpreter 316 and SMT solver 318 may attempt to solve the test case. In doing so, abstract interpreter 316 may repeat its analysis with multiple abstract domain representations 320, 322, 324 or send its preliminary results to SMT solver 318 or symbolic executor 314. SMT solver 318 may provide the findings of its analysis in results 108. Based on the results, symbolic executor 314 may continue or discontinue symbolically executing code-under-test 104 at the given state.

Figure 4:
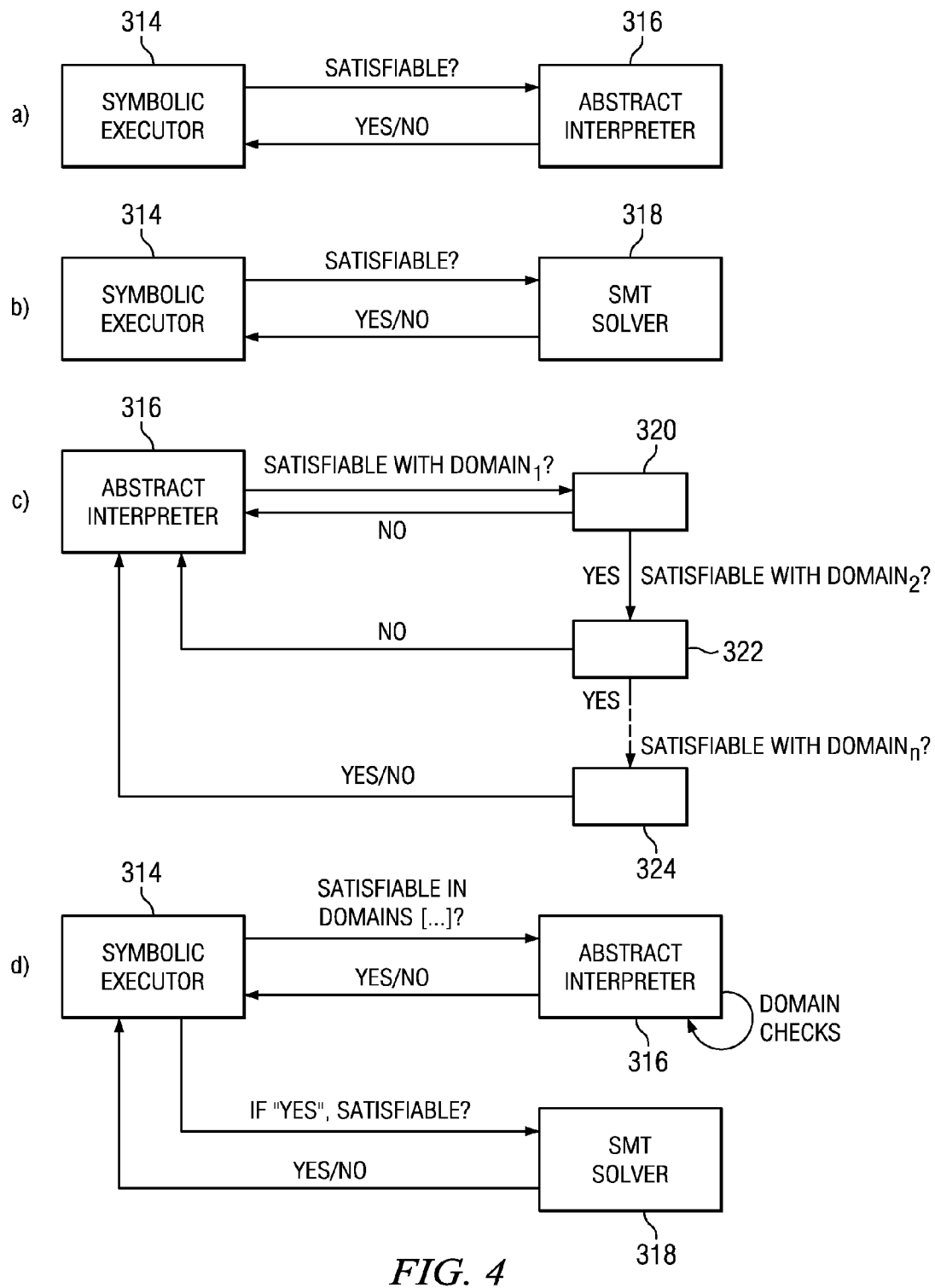
FIG. 4 is a more detailed illustration of the operation of a symbolic executor, abstract interpreter, and Satisfiability Modulo Theory solver.

FIG. 4 is a more detailed illustration of the operation of symbolic executor 314, abstract interpreter 316, and SMT solver 318. In situation "a", symbolic executor 314 may send a test case to abstract interpreter 316 to determine whether the test case is satisfiable or not. Abstract interpreter 316 may analyze the test case and provide an indication of whether the test case is solvable or not to symbolic executor 314. Situation "a" may represent, for example, evaluation of a test case for a non-leaf node or sub-tree from FIG. 2.

In situation "b", symbolic executor 314 may send a test case to SMT solver 318 to determine whether the test case is satisfiable or not. SMT solver 318 may analyze the test case and provide an indication of whether the test case is solvable or not to symbolic executor 314. Situation "b" may represent, for example, evaluation of a test case for a leaf node from FIG. 2.

In situation "c", symbolic executor 314 may send a test case to abstract interpreter 316 to determine whether the test case is satisfiable or not. Abstract interpreter 316 may analyze the test case with a sequence of abstract domain representations 320, 322, 324. Abstract interpreter 316 may access instances of abstract domain representations 320, 322, 324 in order or increasing complexity. If analysis with a first abstract domain representation 320 shows that the test case is not solvable, abstract interpreter 316 may provide an indication that the test case is unsolvable to symbolic executor 314. If the test case is solvable, then abstract interpreter 316 may access a second abstract domain representation 322 analyze the test case. The analysis with the second abstract domain representation 322 may use information, knowledge, or constraints obtained in analysis with the first abstract domain representation 320. If analysis with the second abstract domain representation 322 shows that the test case is not solvable, abstract interpreter 316 may provide an indication that the test case is unsolvable to symbolic executor 314. The analysis with the third abstract domain representation 324 may use information, knowledge, or constraints obtained in analysis with the first abstract domain representation 320 and the second abstract domain representation 322. If the test case is solvable, then abstract interpreter 316 may access a third abstract domain representation 324. Abstract interpreter 316 may analyze the test case and provide a resulting indication of whether the test case is solvable or not to symbolic executor 314. Abstract interpreter 316 may repeat its analysis with any number of instances of abstract domain representations. Situation "c" may represent, for example, a non-leaf node in FIG. 2 representing an operation prone to false-positives.

In situation "d", symbolic executor 314 may first send a test case to abstract interpreter 316 to determine whether the test case is satisfiable or not. Abstract interpreter 316 may analyze the test case and provide an indication of whether the test case is solvable or not to symbolic executor 314. Abstract interpreter 316 may perform such analysis once as shown in situation "a" or multiple times as shown in situation "c". In one embodiment, abstract interpreter 316 may send a determination that the test case is solvable to SMT solver 318. If abstract interpreter 316 determines that the test case is solvable, then the test case may be provided to SMT solver 318 in order that SMT solver 318 may make its own determination whether the test case is satisfiable or not. SMT solver 318 may analyze the test case and provide an indication of whether the test case is solvable or not to symbolic executor 314. Situation "d" may represent, for example, a leaf node in FIG. 2 representing an operation requiring efficient, accurate solving or a non-leaf node in FIG. 2 representing an operation especially prone to false-positive inefficiencies, such as a loop termination condition.

Although separate communication is shown between abstract interpreter 316 and symbolic executor 314 and between SMT solver 318 and symbolic executor 314, SMT solver 318 and symbolic executor 316 may be configured to directly communicate with each other.

Figure 5:
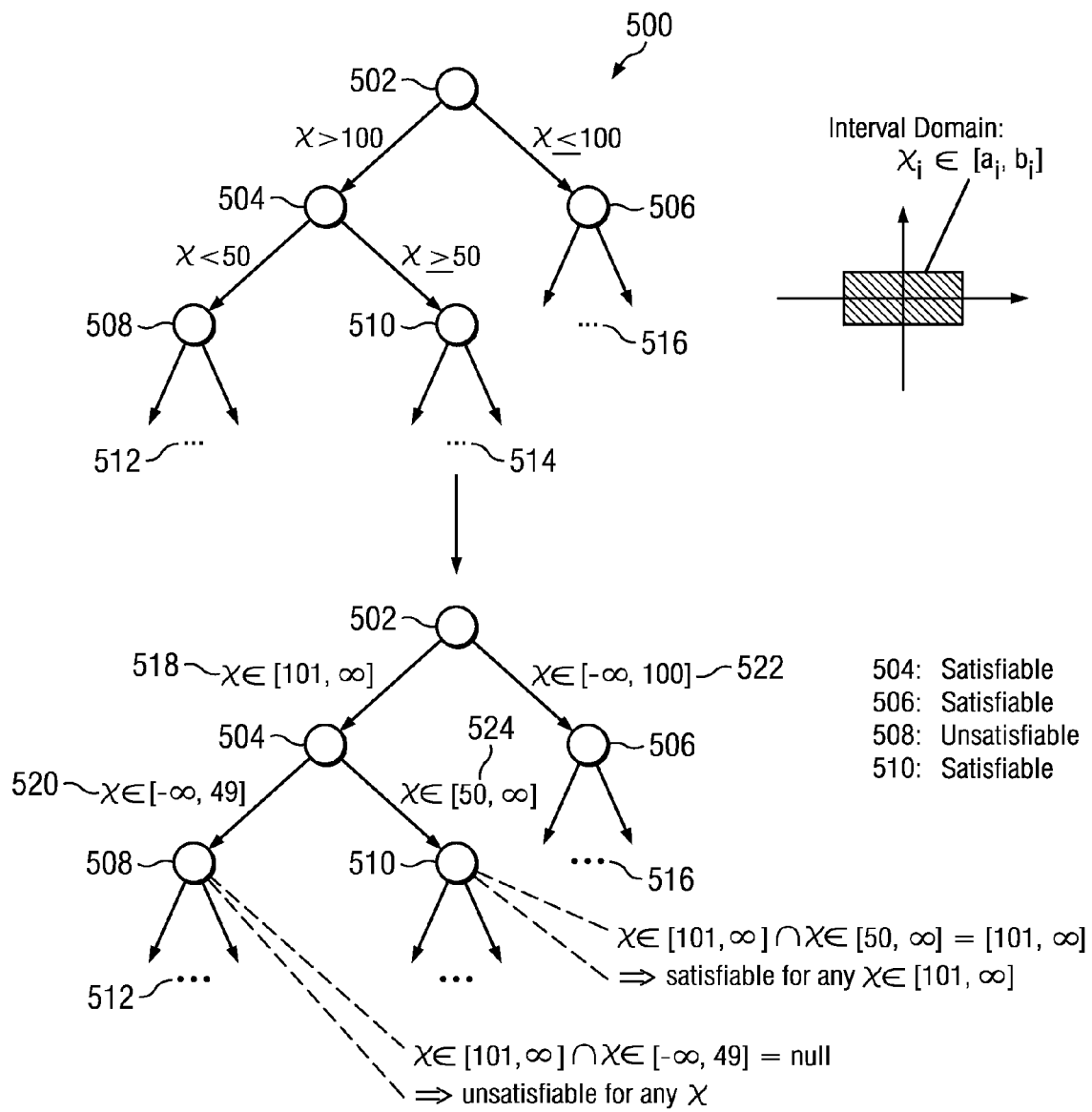
FIG. 5 is a more detailed illustration of an example of the operation of a test module for applying abstract interpretation shown through an execution tree.

FIG. 5 is a more detailed illustration of an example of the operation of test module 300 for applying abstract interpretation shown through an execution tree 500. Execution tree 500 may have a starting node 502, representing a conditional operation such as "(x>100)" causing two branches of symbolic execution: one where the variable x is greater than one hundred, leading to node 504; and one where the variable x is less than or equal to one hundred, leading to node 506 and its associated sub-tree. Such expressions may be retained as constraints binding upon the branch's progeny.

Node 504 may represent a conditional operation such as ("x<50)" causing two branches of symbolic execution: one where the variable x is less than fifty, leading to node 508 and sub-tree 512; and one where the variable x is greater than or equal to fifty, leading to node 510 sub-tree 514. Such expressions may be retained as constraints binding upon the branch's progeny.

While no leaf nodes are present thus far within execution tree 500, the generation of sub-trees 512, 514, 516 in conjunction with nodes 506, 508, 510 demonstrate the propagation of states within execution tree 500 that will need evaluation. Thus, analysis of whether test cases associated with the newly generated nodes or sub-trees may be accomplished to potentially pare the sub-tree and reduce the ultimate number of leaf nodes, thus reducing the required resources to fully validate code-under-test 104. SMT solver 318 may be able to analyze the equations and relationships at node 508 to determine that there is no solution for the full set of constraints and conditions at node 508. Further, SMT solver 318 may be able to analyze the equations and relationships at node 510 to determine that there is a solution for the full set of constraints and conditions at node 510. However, configuring test module 300 to utilize SMT solver 318 for analyzing test cases for nodes 508, 510 may be resource intensive.

For nodes 508, 510, test module 300 may select, for example, an interval domain for use by abstract interpreter 316 to quickly analyze test cases for 508, 510. An interval domain may be shown graphically as a rectangle and include a concrete range of possible values available for a variable. For example, application of the interval domain by abstract interpreter 316 to the execution shown in execution tree 500 may result in the addition of intervals 518, 520, 522, 524. Based on node 502, one resulting execution branch is interval 518 with a set of possible values of integer x wherein ($x \in [100, \infty]$) and another resulting execution branch is interval 522 with a set of possible values of integer x wherein ($x \in [-\infty, 100]$). Based on node 504, one resulting execution branch is interval 520 with a set of possible values of integer x wherein ($x \in [-\infty, 49]$) and another resulting execution branch is interval 524 with a set of possible values of integer x wherein ($x \in [50, \infty]$).

For a given test case, abstract interpreter 216 may conduct analysis on the combination of the domains collected through symbolic execution of code-under-test 104 represented by a path to a given node or sub-tree in execution tree 500. Abstract interpreter 316 may conduct analysis by determining, for example, the intersection of such domains. Different domains in terms of scope and type may be compared with each other. If the intersection of such domains is null or an empty set, then no solutions exist for the test case. If the intersection of such domains yields any members, then the test case is validated because the intersection represents possible solutions for the test case, at least according to abstract interpretation.

In the example shown in FIG. 5, abstract interpreter 316 may analyze a test case for node 508. Abstract interpreter 316 may determine the intersection of domains resulting from the execution path from node 502 and node 504 to node 508 along with any other constraints or conditions determined in such symbolic execution or by the design of software-under-test 104. Thus, abstract interpreter 316 may determine:

$$(x \in [100, \infty]) \cap (x \in [-\infty, 49]) = \emptyset \text{<null>} \rightarrow \text{unsatisfiable for any } x$$

Consequently, abstract interpreter 316 may determine that the code associated with node 508 will not be executed as it is impossible for code-under-test 104 to reach the state represented by node 508. This condition may be reported in results 108. Test module 300 may cease symbolic execution of the branch represented by node 508, as such operations cannot be validated.

Further, abstract interpreter 316 may analyze a test case for node 510. Abstract interpreter 316 may determine the intersection of domains resulting from the execution path from node 502 and node 504 to node 510 along with any other constraints or conditions determined in such symbolic execution or by the design of software-under-test 104. Thus, abstract interpreter 316 may determine:

$$(x \in [100, \infty]) \cap (x \in [50, \infty]) = [100, \infty] \rightarrow \text{satisfiable for any } x \in [100, \infty])$$

Consequently, abstract interpreter 316 may determine that the code associated with node 508 is validated as solutions exist for the test case. Test module 300 may continue symbolic execution of the branch represented by node 510.

Figure 6A:
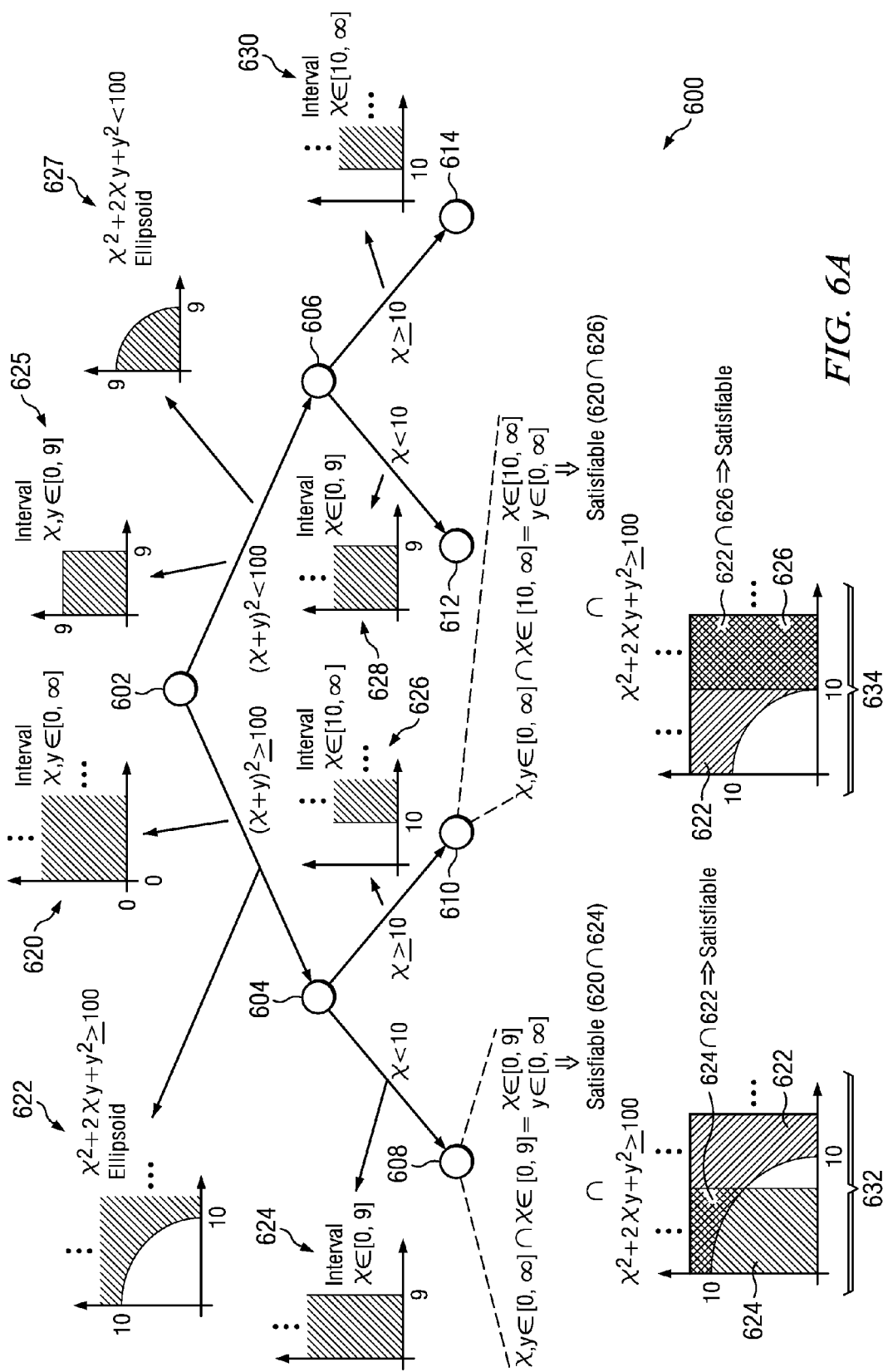
FIGS. 6a and 6b are more detailed illustrations of another example of the operation of a test module for applying abstract interpretation, including nonlinear expressions, shown through an execution tree.
Figure 6B:
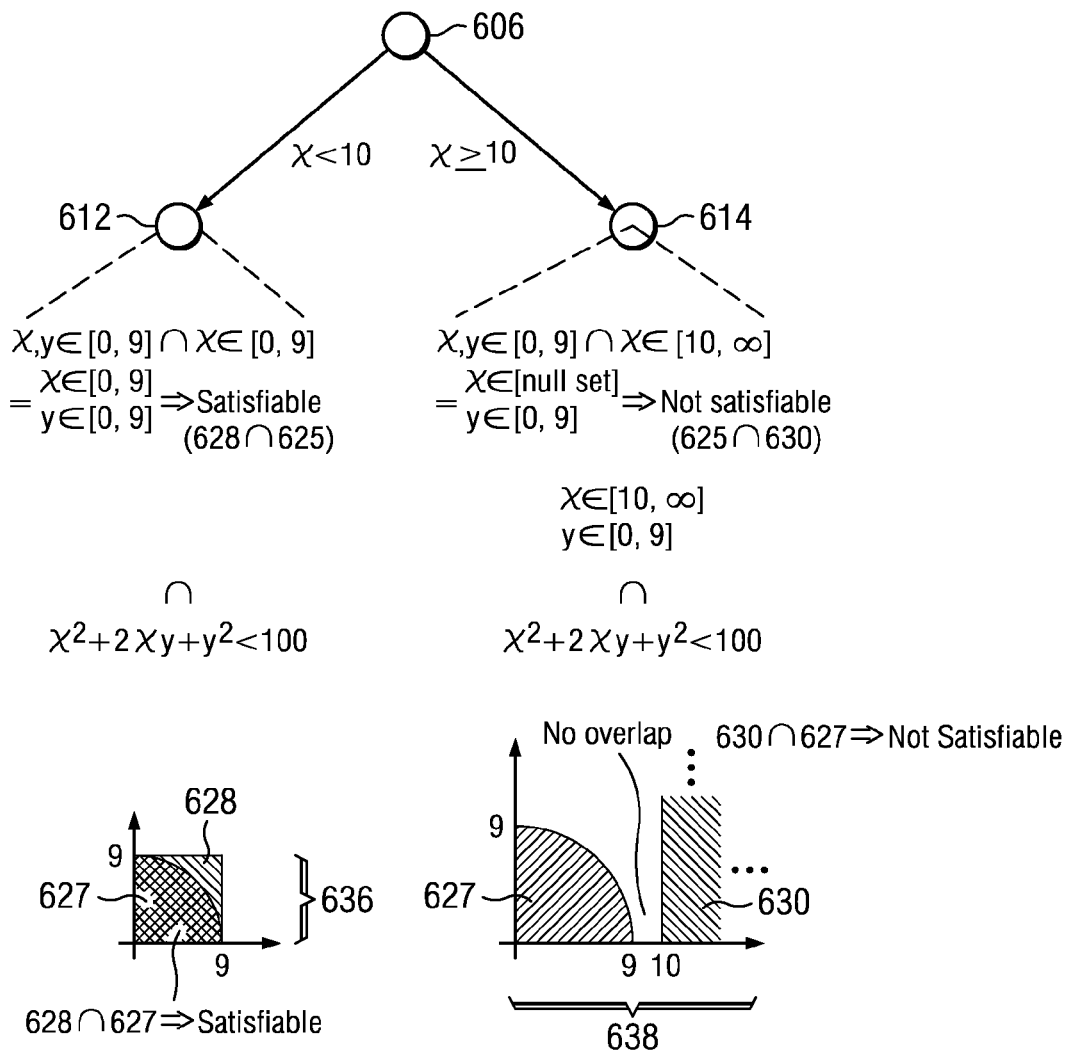

FIGS. 6a and 6b are more detailed illustrations of another example of the operation of test module 300 for applying abstract interpretation, including nonlinear expressions, shown through an execution tree 600.

Execution tree 600 may have a starting node 602, representing a conditional operation such as "$(x+y)^2 \geq 100$" causing two branches of symbolic execution: one where the square of the sum of the variables x and y is greater than or equal to one hundred, leading to node 604; and one where the square of the sum of the variables x and y is less than one hundred, leading to node 606. Such expressions may be retained as constraints binding upon the branch's progeny.

Node 604 may represent a conditional operation such as ("x<10") causing two branches of symbolic execution: one where the variable x is less than ten, leading to node 608 and any associated sub-tress; and one where the variable x is greater than or equal to ten, leading to node 610 and any associated sub-trees. Such expressions may be retained as constraints binding upon the branch's progeny.

Node 606 may represent a conditional operation such as ("x<10") causing two branches of symbolic execution: one where the variable x is less than ten, leading to node 612 and any associated sub-tress; and one where the variable x is greater than or equal to ten, leading to node 614 and any associated sub-trees. Such expressions may be retained as constraints binding upon the branch's progeny.

Use of SMT solving may be inefficient or ineffective to solve test cases based on nonlinear equations such as the expression of node 602, "$(x+y)^2 \geq 100$". Further, solving such nonlinear equations in combination with other expressions may also be handled inefficiently with SMT solving. In one embodiment, use of abstract interpretation upon nodes 602, 604, 606, 608, 610, 612 and their progeny may be used to quickly determine the satisfiability of the conditions associated with the branches of each node. Furthermore, the use of abstract interpretation on these nodes may be used to create concrete test cases with over-approximations for the conditional branches represented by nodes 602, 604, 606, 608, 610, 612 and their progeny. For nodes 602, 604, 606, 608, 610, 612 test module 300 may select, for example, an interval domain for use by abstract interpreter 316 to quickly analyze test cases for nodes 602, 604, 606, 608, 610, 612. An interval domain may be shown graphically as a rectangle and include a concrete range of possible values available for a variable. For example, application of an interval domain by abstract interpreter 316 to the execution shown in execution tree 600 may result in the addition of intervals 620, 624, 625, 626, 628, 630.

For nodes 602, 604, 606, 608, 610, 612 test module 300 may select, for example, an ellipsoid domain for use by abstract interpreter 316 to quickly analyze test cases for nodes 602, 604, 606, 608, 610, 612 test module 300. An ellipsoid domain may be shown graphically as the interior or exterior of a ellipse or portion thereof and include a concrete range of possible values available for a variable. For example, application of an ellipsoid domain by abstract interpreter 316 to the execution shown in execution tree 600 may result in the addition of ellipsoids 622 and 627.

Thus, for some branches of execution, the condition may be represented by an ellipsoid or an interval. In some embodiments, the ellipsoid may provide more accurate representation of the possible concrete values of the variables for the branch of execution because it is not as over-inclusive as the interval representation. For example, the branch of execution corresponding to "$(x+y)^2 \geq 100$" from node 602 may be represented by ellipsoid 622 or interval 620. The area represented by ellipsoid 622 is less than interval 620, and thus ellipsoid 622 may be a more detailed and less over-inclusive representation of the execution's possible values than interval 620. The result may be that use of ellipsoid 622 rather than interval 620 may yield more accurate results.

At any given node 602, 604, 606, 608, 610, 612 test module 300 may be configured to apply one or more of intervals 620, 624, 625, 626, 628, 630 or ellipsoids 622 and 627 as appropriate to the branch of execution.

Based on node 602, one resulting execution branch corresponding to "$(x+y)^2 \geq 100$" may generate interval 620 with a set of possible values of integers x, y wherein (x, y∈[0, ∞]) or may generate ellipsoid 622 with a set of possible values of integers x, y wherein ($x^2+2xy+y^2 \geq 100$) shown as the region above the semicircle of ellipsoid 622, including the line of the semicircle. Another resulting execution branch from node 602 corresponding to "$(x+y)^2 < 100$" may generate interval 625 with a set of possible values of integers x, y wherein (x, y∈[0, 9]) or may generate ellipsoid 627 with a set of possible values of integers x, y wherein ($x^2+2xy+y^2 < 100$) shown as the region below the semicircle of ellipsoid 627, including the line of the semicircle.

Based on node 604, one resulting execution branch corresponding to "x<10" may generate interval 624 with a set of possible values of integer x wherein (x∈[0,9]). Another resulting execution branch from node 604 corresponding to "x≥10" may generate interval 626 with a set of possible values of integer x wherein (x∈[10, ∞]).

Based on node 606, one resulting execution branch corresponding to "x<10" may generate interval 628 with a set of possible values of integer x wherein (x∈[0,9]). Another resulting execution branch from node 606 corresponding to "x≥10" may generate interval 630 with a set of possible values of integer x wherein (x∈[10, ∞]).

For a given test case at a node, abstract interpreter 216 may conduct analysis on the combination of the domains collected through symbolic execution of code-under-test 104 represented by a path to a given node or sub-tree in execution tree 600. Abstract interpreter 316 may conduct analysis by determining, for example, the intersection of such domains. Different domains in terms of scope and type may be compared with each other. If the intersection of such domains is null or an empty set, then no solutions exist for the test case. If the intersection of such domains yields any members, then the test case is validated because the intersection represents possible solutions for the test case, at least according to abstract interpretation.

In the example shown in FIG. 6, abstract interpreter 316 may analyze test cases for nodes 608, 610, 612, 614. Abstract interpreter 316 may determine the intersection of domains resulting from the execution path from node 602 and 604 to node 608 along with any other constraints or conditions determined in such symbolic execution or by the design of software-under-test 104. Such domains may include interval 624 in combination with interval 620 or ellipsoid 622. Thus, using interval 624 in combination with interval 620 abstract interpreter 316 may determine:

$$(x,y \in [0,\infty]) \cap (x \in [0,9]) = x \in [0,9], y \in [0,\infty] \rightarrow \text{satisfiable for any such } x \text{ or } y$$

Further, using interval 624 in combination with ellipsoid 622 as shown in graph 632, abstract interpreter 316 may determine that the intersection of interval 624 and ellipsoid 622 results in various possible values for integers x and y as shown in graph 632. Thus, the intersection of interval 624 and ellipsoid 622 is satisfiable. Consequently, abstract interpreter 316 may determine that the code associated with node 608 is validated as solutions exist for the test case. Test module 300 may continue symbolic execution of the branch represented by node 608. The set of possible values for integers x and y may be narrower using the intersection of interval 624 and ellipsoid 622 as compared to the set of possible values for integers x and y resulting from using the intersection of interval 624 and interval 620. Thus, use of ellipsoid 622 may provide solution sets that are less over-inclusive than use of intervals alone.

Abstract interpreter 316 may determine the intersection of domains resulting from the execution path from node 602 and 604 to node 610 along with any other constraints or conditions determined in such symbolic execution or by the design of software-under-test 104. Such domains may include interval 626 in combination with interval 620 or ellipsoid 622. Thus, using interval 626 in combination with interval 620 abstract interpreter 316 may determine:

$$(x,y \in [0,\infty]) \cap (x \in [10,\infty]) = x \in [10,\infty], y \in [0,\infty] \rightarrow \text{satisfiable for any such } x \text{ or } y$$

Further, using interval 626 in combination with ellipsoid 622 as shown in graph 634, abstract interpreter 316 may determine that the intersection of interval 624 and ellipsoid 622 results in various possible values for integers x and y as shown in graph 632. Thus, the intersection of interval 626 and ellipsoid 622 is satisfiable. Consequently, abstract interpreter 316 may determine that the code associated with node 610 is validated as solutions exist for the test case. Test module 300 may continue symbolic execution of the branch represented by node 610. The set of possible values for integers x and y may be narrower using the intersection of interval 626 and ellipsoid 622 as compared to the set of possible values for integers x and y resulting from using the intersection of interval 626 and interval 620. Thus, use of ellipsoid 622 may provide solution sets that are less over-inclusive than use of intervals alone.

Abstract interpreter 316 may determine the intersection of domains resulting from the execution path from node 602 and 606 to node 612 along with any other constraints or conditions determined in such symbolic execution or by the design of software-under-test 104. Such domains may include interval 628 in combination with interval 625 or ellipsoid 627. Thus, using interval 628 in combination with interval 625 abstract interpreter 316 may determine:

$$(x,y \in [0,9]) \cap (x \in [0,9]) = x \in [0,9], y \in [0,9] \rightarrow \text{satisfiable for any such } x \text{ or } y$$

Further, using interval 628 in combination with ellipsoid 627 as shown in graph 636, abstract interpreter 316 may determine that the intersection of interval 628 and ellipsoid 627 results in various possible values for integers x and y as shown in graph 636. Thus, the intersection of interval 628 and ellipsoid 627 is satisfiable. Consequently, abstract interpreter 316 may determine that the code associated with node 612 is validated as solutions exist for the test case. Test module 300 may continue symbolic execution of the branch represented by node 612. The set of possible values for integers x and y may be narrower using the intersection of interval 628 and ellipsoid 627 as compared to the set of possible values for integers x and y resulting from using the intersection of interval 628 and interval 625. Thus, use of ellipsoid 627 may provide solution sets that are less over-inclusive than use of intervals alone.

Abstract interpreter 316 may determine the intersection of domains resulting from the execution path from node 602 and 606 to node 614 along with any other constraints or conditions determined in such symbolic execution or by the design of software-under-test 104. Such domains may include interval 630 in combination with interval 625 or ellipsoid 627. Thus, using interval 630 in combination with interval 625 abstract interpreter 316 may determine:

$$(x,y \in [0,9]) \cap (x \in [0,\infty]) = x \in [\emptyset < \text{null}>], y \in [0,9] \rightarrow \text{not satisfiable for any values of } x \text{ or } y$$

Further, using interval 630 in combination with ellipsoid 627 as shown in graph 638, abstract interpreter 316 may determine that no intersection exists for interval 630 and ellipsoid 627, resulting in no overlap and no possible values for integers x and y that may solve both ellipsoid 627 and interval 630 conditions as shown in graph 638. Thus, the intersection of interval 630 and ellipsoid 627 is unsatisfiable. Consequently, abstract interpreter 316 may determine that the code associated with node 614 will not be executed as it is impossible for code-under-test 104 to reach the state represented by node 614. This condition may be reported in results 108. Test module 300 may cease symbolic execution of the branch represented by node 614, as such operations cannot be validated.

Figure 7:
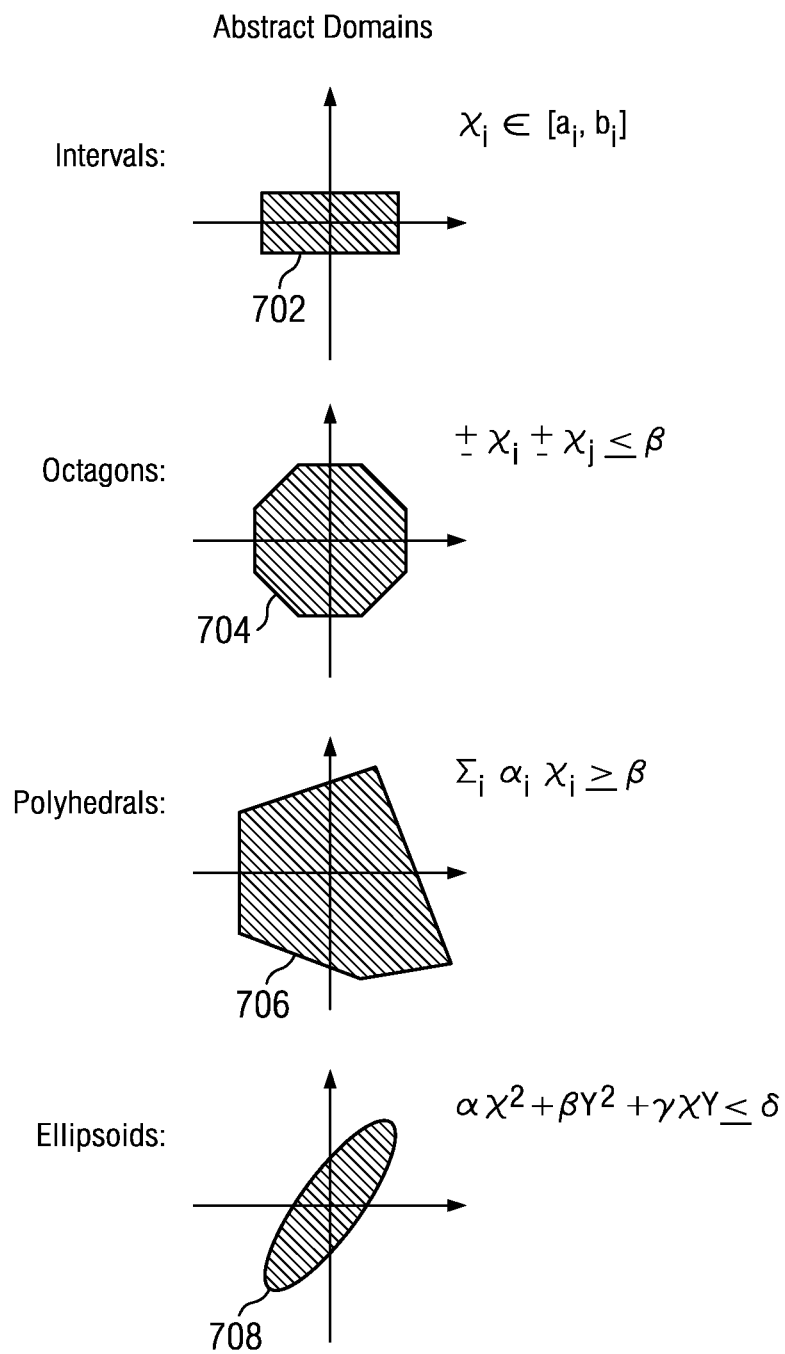
FIG. 7 is an illustration of example embodiments of abstract domains that may be used by an abstract interpreter to conduct abstract interpretation.

FIG. 7 is an illustration of example embodiments of abstract domains that may be used by abstract interpreter 316 to conduct abstract interpretation.

Abstract interpreter 316 may utilize an interval domain 702, wherein an element $x_i$ may have concrete values within the range of $[a_i, b_i]$. Interval domain 702 may be represented graphically by a rectangle.

Abstract interpreter 316 may utilize an octagon domain 704, wherein the combination of elements $\pm x_i$ and $\pm x_j$ may be less than or equal to a value β. Octagon domain 704 may be represented graphically by an octagon.

Abstract interpreter 316 may utilize a polyhedral domain 706, wherein the sum of the products of elements $\alpha_i$ and $x_i$ may be greater than or equal to a value β. Polyhedral domain 706 may be represented graphically by an irregular shape with linear edges.

Abstract interpreter 316 may utilize an ellipsoid domain 708, wherein given elements x and y, the sum of $\alpha x^2$, $\beta y^2$, and $\gamma xy$ may be less than or equal to a value δ. Ellipsoid domain 708 may be represented graphically by two-dimensional curved shape or other ellipsoid.

Test module 300 may select a given domain type and instance based on the ability of the domain to adequately cover all the values given by a constraint determined from symbolic execution. The given domain may be overinclusive or an over-approximation, given that it may encompass more concrete values than are actually allowed by the constraint. For example, a constraint may specify that an integer variable x may have three distinct possible values, zero, one, and five. An interval domain 702 may be selected such that (x∈[0, 5]). The concrete values in the interval domain include the integers two, three, and four, which are not acceptable values according to the constraint. Thus, the interval domain 702 of (x∈[0, 5]) may be overinclusive. If combined with a subsequent constraint discovered during symbolic execution that acceptable values of integer x are three and four, such that (x∈[3, 4]), an intersection of the two interval domains would yield (x∈[3, 4]) as an acceptable solution. However, this would be a false-positive validation result, as the over-approximation from the first interval domain of (x∈[0, 5]) did not fully reflect the constraint's limitations, only the constraint's possible acceptable values.

This inaccuracy may be corrected by application of SMT solving or more rigorous abstract interpretation at this or a subsequent child node. Hence, test module 300 may be configured to employ abstract interpretation to tolerate false-positives but prevent undetected unsatisfiable test cases.

Figure 8:
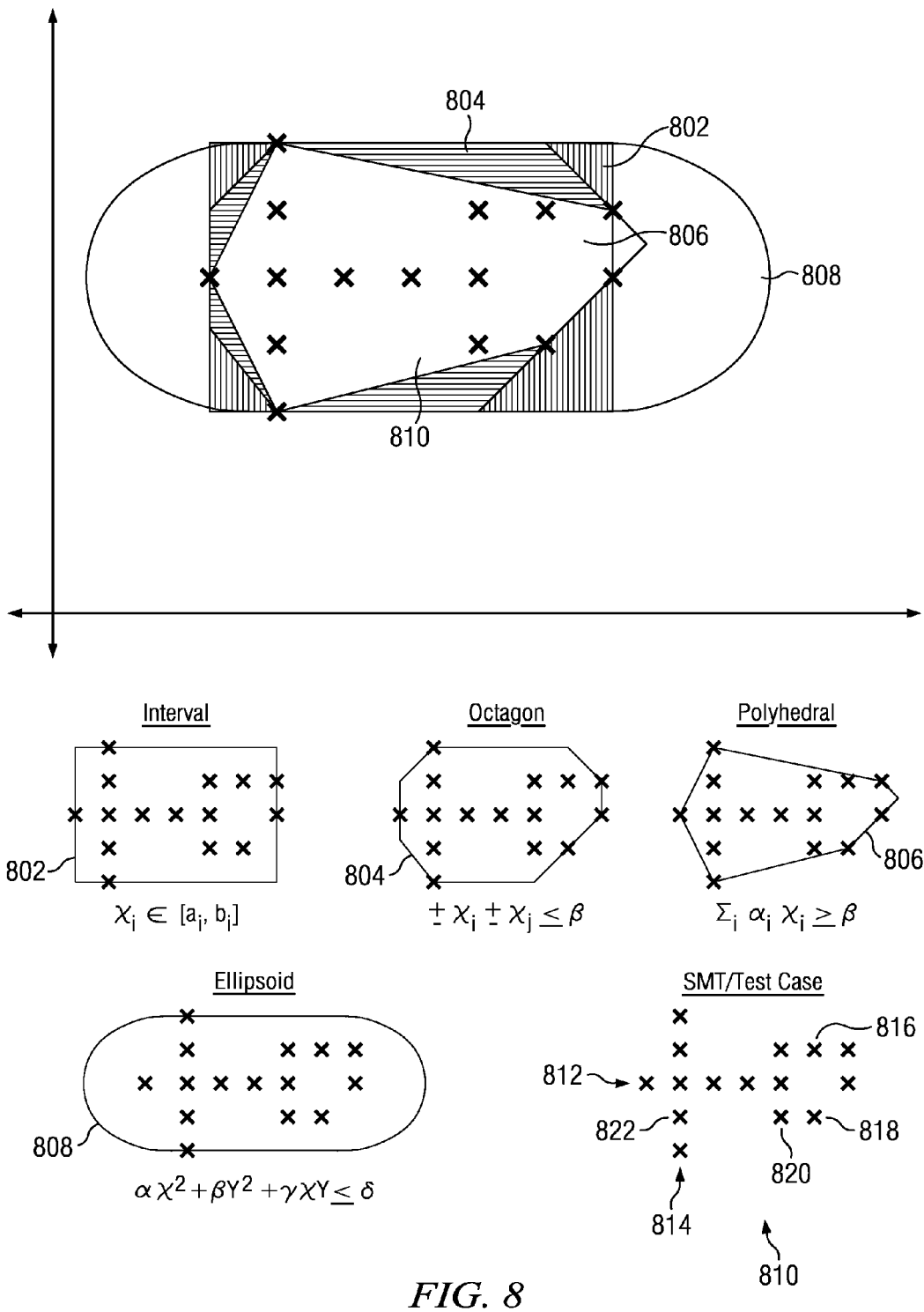
FIG. 8 is an illustration of the operation of an abstract interpreter to apply various domain types and instances to a test case.

FIG. 8 is an illustration of the operation of abstract interpreter 316 to apply various domain types and instances to a test case. The test case may include multiple sets of constraints or conditions.

The contents of the test case may be shown as SMT domain 810. The actual possible values, if exhaustively and conclusively solved by SMT solver 318, would result in the data values sown in SMT domain 810. Given the same constraints that eventually yielded SMT domain 810, abstract interpreter 316 may apply various domains to cover, but perhaps over-approximate, the test case.

Abstract interpreter 316 may apply an interval domain to yield domain 802. Domain 802 may appear as a rectangle and cover more possible values that are absolutely necessary to cover the data shown in SMT domain 810. However, given the shape of a rectangle, domain 802 may represent the smallest interval domain able to cover the actual possible values without missing a possible solution. For example, if not for element 812, the interval could be one unit narrower in the horizontal plane. Further, if not for element 814, the interval could be one unit narrower in the vertical plane. Domain 802 over-approximates numerous possible values not included in SMT domain 810. Illustrative examples of over-approximated portions of domain 802 include: all other possible values in the vertical plane with element 812; all other possible values in the horizontal plane with element 814; and values between elements 816 and 818.

Abstract interpreter 316 may apply an octagon domain to yield domain 804. Domain 804 may appear as a octagon with sides of different lengths and cover more possible values that are absolutely necessary to cover the data shown in SMT domain 810. However, given the shape of the octagon, domain 804 prevents missing a possible solution while lessening superfluous values. Domain 804 contains over-approximated portions, such as: all other possible values in the vertical plane with element 812; all other possible values in the horizontal plane with element 814; and values between elements 816 and 818. However, when compared to interval-based domain 802, octagon-based domain 804 contains less superfluous values that are not included in SMT domain 810. For example, there are fewer possible superfluous values in the vertical plane of element 812.

Abstract interpreter 316 may apply a polyhedral domain to yield domain 806. Domain 806 may appear as an irregularly-shaped polygon with straight, linear sides of different lengths and internal angles of different degrees. Domain 806 may cover more possible values that are absolutely necessary to cover the data shown in SMT domain 810. However, given the shape of the polyhedral, domain 806 may prevent missing a possible solution while lessening superfluous values. Domain 806 contains over-approximated portions, such as: all other possible values in the horizontal plane with elements 818, 820, and 822; and values between elements 816 and 818. However, when compared to interval-based domain 802 or octagon-based domain 804, polyhedral-based domain 806 contains less superfluous values that are not included in SMT domain 810. For example, there are fewer possible values in the horizontal plane of element 814.

Abstract interpreter 316 may apply an ellipsoid domain to yield domain 808. Domain 808 may appear as a curved shape. Domain 808 may cover more possible values that are absolutely necessary to cover the data shown in SMT domain 810. However, given its curved shape, domain 808 may prevent missing a possible solution while lessening superfluous values. Domain 806 contains over-approximated portions, such as: all other possible values in the vertical plane with element 812; all other possible values in the horizontal plane with element 814; and values between elements 816 and 818. Domain 808 may have more superfluous values when compared to other abstract domains of FIG. 8. However, for any given set of data, any one of the abstract domains of FIG. 8 may be better suited for minimizing superfluous values while maintaining all possible solutions for the test case.

Also shown in FIG. 8 is a juxtaposition of domains 802, 804, 806, 808, 810 together. While for any given test case the best abstract domain may be any one of abstract domains 802, 804, 806, 808, often an interval-based domain 802 may be less complex and easier to solve than an octagon-based domain 804, which may be less complex and easier to solve than a polyhedral-based domain 806, which may be less complex and easier to solve than an ellipsoid-based domain 810. All such abstract domains may be less complex and easier to solve than SMT-based analysis. However, as shown by the juxtaposed domains in FIG. 8 the increased complexity may sometimes afford greater accuracy with less false-positives. Thus, test module 100 may select one or more domains for use by abstract interpreter 316, or select SMT solver 318 in combination with abstract interpreter 316 to balance the resource costs of solving a given test case with the resource costs of false-positive validation of code-under-test 104.

Figure 9:
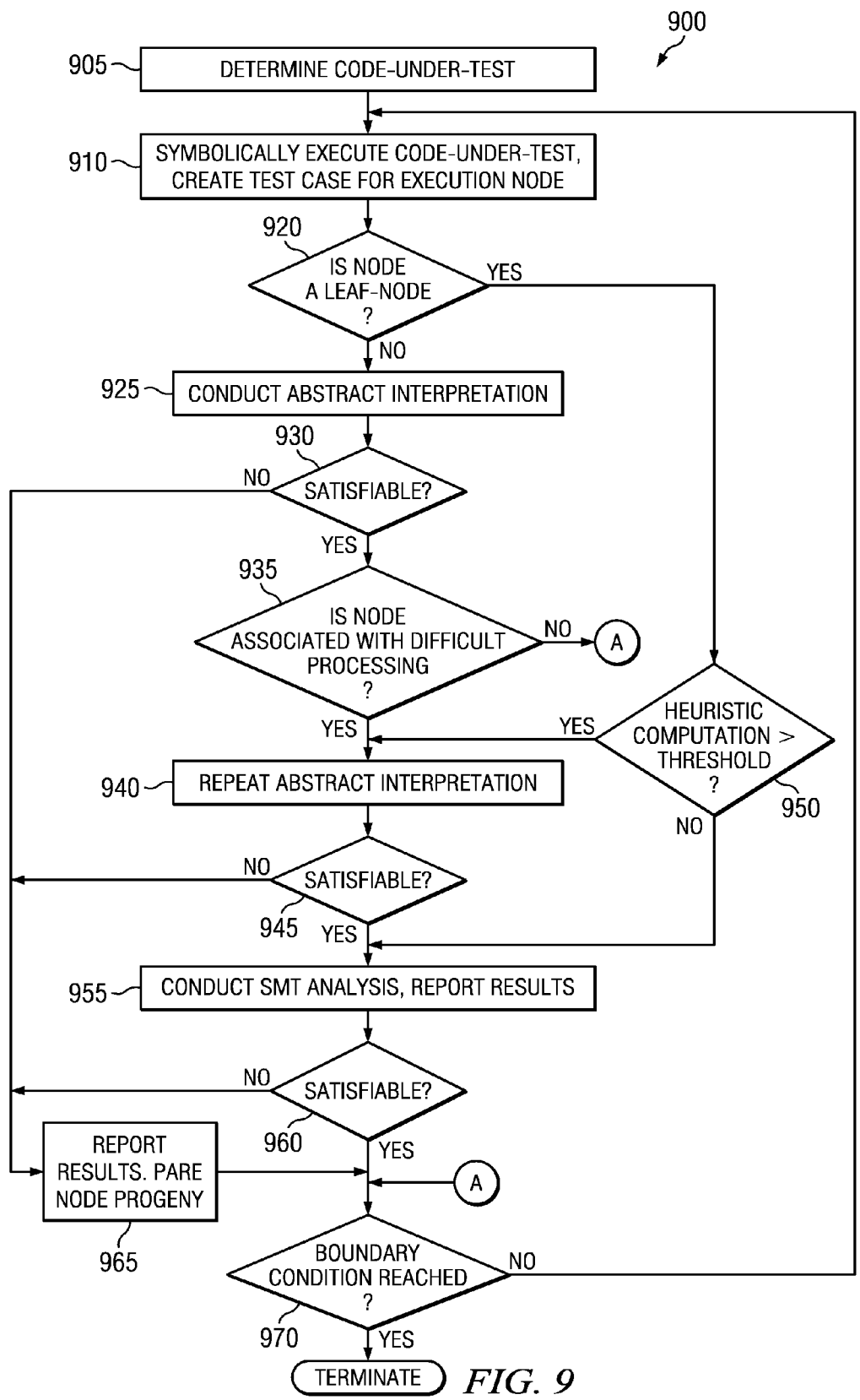
FIG. 9 is an illustration of an example embodiment of a method for abstract symbolic execution for scaling symbolic execution and automatic test generation.

FIG. 9 is an illustration of an example embodiment of a method 900 for abstract symbolic execution for scaling symbolic execution and automatic test generation. In step 905, code-under-test may be determined. The code-under-test may include all or a portion of software to be evaluated. The code-under-test may include sequences of instructions received from the execution of another instance of method 900.

In step 910, the code-under-test may be symbolically executed. Content within code-under-test may include such content as variables, functions, objects, or values. The content to be symbolically executed may be related to specific constraints under which the code-under-test is being tested. Symbolic execution may generate conditions or constraints. Symbolic execution may reach a conditional operation, execution node, or sub-tree within the code-under-test.

Further in step 910, a test case may be created for the execution node or other point of interest within the execution of the code-under-test. The test case may reflect constraints, conditions, and branched executions encountered through symbolic execution leading to the execution node. To analyze the test case, any suitable combination of abstract interpretation and SMT analysis may be conducted. In one embodiment, abstract interpretation and SMT analysis are each used to analyze at least one test case each. Method 900 contains several example embodiments of criteria and resulting combinations of abstract interpretation and SMT analysis.

In step 920, it may be determined whether the execution node is a leaf node in an execution tree for the code-under-test. Such a leaf node may reflect a terminal path through the symbolic execution of the code-under-test. If the execution node is a leaf node, then method 900 may proceed to step 950.

If the execution node is not a leaf node, then in step 925 abstract interpretation may be conducted on the test case. Step 925 may be implemented fully or in part by method 1000 of FIG. 10. In step 930 it may be determined whether abstract interpretation shows that the test case is satisfiable or unsatisfiable. If the test case is unsatisfiable, then method 900 may proceed to step 965.

If the test case is satisfiable, then in step 935 it may be determined whether the execution node is associated with difficult test case processing. Such processing may include evaluation of complex data structures, loop termination conditions, incompatibility of test case constraints, unsuitability of an available abstract interpretation domain for the test case, or policies given explicitly by users using a specification language. In such situations, additional abstract interpretation, SMT analysis, or both may be conducted. If the nod is not associated with difficult test case processing, then method 900 may proceed to step 970.

If the node is associated with difficult test case processing, then in step 940 abstract interpretation may be repeated one or more times. The abstract interpretation may be conducted fully or in part by method 1000 of FIG. 10. The abstract interpretation may be repeated using a different or more complex abstract domain. The additional abstract domains may vary from the one used in step 925 and from each other in type or via operating parameters. For example, if an interval domain was used in step 925, in step 940 a tighter interval domain or a polyhedral domain may be used. In step 945, if any repeated use of abstract interpretation yields a determination that the test case is unsatisfiable, method 900 may proceed to step 965. Otherwise, method 900 may proceed to step 955.

In step 950, the test case may have been identified as associated with a leaf node. The SMT analysis necessary to evaluate the node may be evaluated. If excessive SMT analysis is required to solve the test case, method 900 may first apply one or more abstract interpretation iterations in an attempt to quickly solve the test case. Consequently, if a metric, such as the number of heuristic computations, exceeds a threshold, then method 900 may proceed to step 940.

However, if the metric is not exceeded, or if repeated abstract interpretation is to be followed by SMT analysis, in step 955 SMT analysis may be conducted on the test case. SMT analysis may be conducted in any suitable manner. Further, results of the SMT analysis may be reported. In step 960, it may be determined whether or not the test case is satisfiable or unsatisfiable. If the test case is unsatisfiable, method 900 may proceed to step 965. If the test case is satisfiable, then method 900 may proceed to step 970.

In step 965, it may have been determined through abstract interpretation or SMT analysis that the test case is unsolvable. Thus, the code-under-test associated with the node may be unreachable or may contain a bug, error, dead-spot, security violation, or other condition preventing validation. Results may be reported. Further, child progeny of the node may be pared from future symbolic execution. Method 900 may proceed to step 970.

In step 970, it may be determined whether a boundary condition for symbolic execution has been reached. Such a condition may include depth of execution, number of iterations, time, completeness, or another suitable metric. If the boundary condition has not been reached, then method 900 may return to step 910 to continue to symbolically execute code-under-test. If the boundary condition has been reached, then method 900 may terminate.

Figure 10:
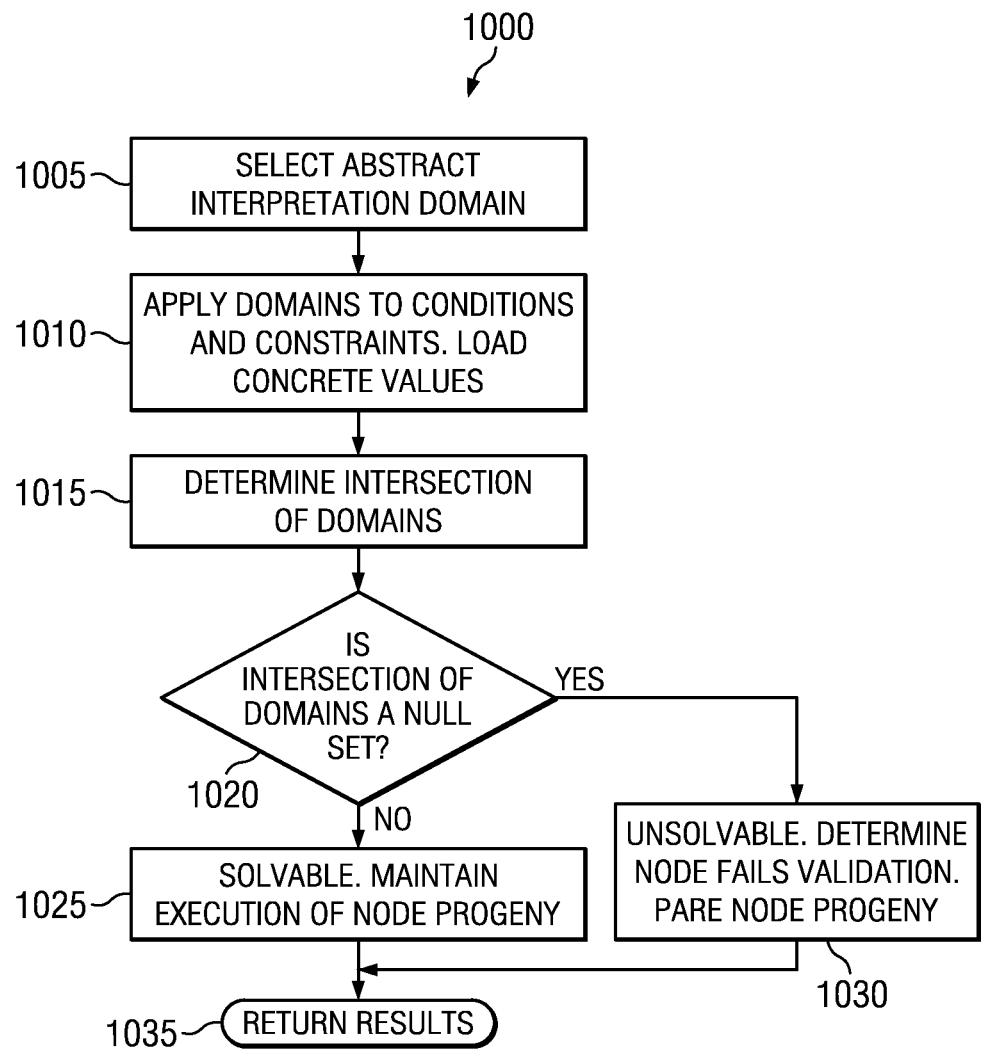
FIG. 10 is an illustration of an example embodiment of a method for conducting abstract interpretation in symbolic execution.

FIG. 10 is an illustration of an example embodiment of a method 1000 for conducting abstract interpretation in symbolic execution. Method 1000 may implement fully or in part steps 925 and 940 of FIG. 9. In step 1005, a test case may be received and analyzed to determine appropriate abstract interpretation domains. The domain may include, for example, interval, octagon, polyhedral, or ellipsoid abstract domains to which the elements of the test case may be mapped. Further, parameters matching the test case may be selected for constructing the domain.

In step 1010, the domains may be applied to conditions and constraints of the test case. Domains may represent a particular condition or constraint as defined by the operating parameters of code-under-test or encountered during the execution path of code-under-test. A given domain may be an over-approximation of the possible values according to a given constraint or condition. Further, concrete, actual values may be loaded into the domain.

Any suitable mechanism for comparing the domains may be used to evaluate the test case. For example, in step 1015, the intersection of the domains representing the test case may be determined. In step 1020, it may be determined whether the intersection of the domains is empty or a null set. If the intersection of the domains is not empty, then in step 1025 it may be determined that the test case is solvable given the constraints and conditions contained therein. The estimated solution set may correspond to the intersection. However, such a determination may be a false-positive, as the domains are an over-approximation of the possible values of the test case. Thus, when results are reported, a positive determination of an intersection of the domains may not be conclusive proof that a solution exists and a "validated" designation may not yet be applied to the associated code-under-test.

If the intersection of the domains is empty, or is a null set, then in step 1030 it may be determined that the test case is unsolvable and that no solutions exist for which it may be solved. Because over-inclusive, rather than under-inclusive, domains were chosen for abstract interpretation, it may be determined that the unsatisfiability determination is sound and the code-under-test associated with the node fails validation. Further, any progeny of the node may be pared from additional symbolic execution.

In step 1035, the results may be returned.

Although FIGS. 9-10 disclose a particular number of steps to be taken with respect to example methods 900, 1000 may be executed with more or fewer steps than those depicted in FIGS. 9-10. In addition, although FIGS. 9-10 discloses a certain order of steps to be taken with respect to methods 900, 1000, the steps comprising methods 900, 1000 may be completed in any suitable order. Further, various steps of methods 900, 1000 may be conducted in parallel with each other.

Method 500 may be implemented using the system of FIGS. 1-7 or any other system, network, or device operable to implement methods 900, 1000. In certain embodiments, methods 900, 1000 may be implemented partially or fully in software embodied in computer-readable media. For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, and other tangible, non-transitory media; and/or any combination of the foregoing.

All examples and conditional language recited above are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A method comprising, by one or more computing devices:
    determining code-under-test to be evaluated, the code-under-test configured for execution on a computing device; symbolically executing the code-under-test; creating a plurality of test cases based on the symbolic execution and including a plurality of constraints; selectively conducting abstract interpretation on at least one of the constraints, the abstract interpretation including using a plurality of abstract interpretation models based on the constraints of the test case and over-approximating the constraints of the test case; selectively conducting Satisfiability Modulo Theory ("SMT") solving on at least one of the constraints; and validating or invalidating the code-under-test based on at least the SMT solving and the abstract interpretation.

2. The method of claim 1, wherein conducting abstract interpretation includes: determining a first model based on the constraints of the test case;
    determining a second model based on the constraints of the test case; determining the intersection of the two models; validating or invalidating the code-under-test based on the presence of elements within the intersection.

3. The method of claim 1, wherein: the abstract interpretation is conducted upon a test case resulting in a determination that the test case is solvable based on the abstract interpretation models; and the SMT solving is selectively conducted upon the same test case based upon the determination in abstract interpretation that the test case is solvable.

4. The method of claim 1, wherein the abstract interpretation includes loading concrete values into the plurality of abstract interpretation models.

5. The method of claim 1, wherein: abstract interpretation is selectively conducted based upon the position of a test case within the code-under-test; and the test case is associated with an intermediate node in the symbolic execution of code-under-test, the intermediate node having children nodes.

6. The method of claim 1, wherein: SMT solving is selectively conducted based upon the position of a test case within the code-under-test; and the test case is associated with a leaf node in the symbolic execution of the code-under-test.

7. The method of claim 1, further comprising subsequently conducting additional abstract interpretation on the at least one of the test cases upon which abstract interpretation was conducted; wherein the additional abstract interpretation is based on an additional plurality of abstract interpretation models, the additional plurality of abstract interpretation models based upon the same constraints of the test case.

8. A system comprising: a non-transitory computer-readable medium comprising computer-executable instructions; and one or more processors coupled to the non-transitory computer-readable medium and operable to read and execute the instructions, the one or more processors being operable when executing the instructions to: determine code-under-test to be evaluated, the code-under-test configured for execution on a computing device; symbolically execute the code-under-test; create a plurality of test cases based on the symbolic execution and including a plurality of constraints; selectively conduct abstract interpretation on at least one of the constraints, the abstract interpretation including using a plurality of abstract interpretation models based on the constraints of the test case and over-approximating the constraints of the test case; selectively conduct Satisfiability Modulo Theory ("SMT") solving on at least one of the constraints; and validate or invalidate the code-under-test based on at least the SMT solving and the abstract interpretation.

9. The system of claim 8, wherein conducting abstract interpretation includes: determining a first model based on the constraints of the test case;
    determining a second model based on the constraints of the test case; determining the intersection of the two models; validating or invalidating the code-under-test based on the presence of elements within the intersection.

10. The system of claim 8, wherein: the abstract interpretation is conducted upon a test case resulting in a determination that the test case is solvable based on the abstract interpretation models; and the SMT solving is selectively conducted upon the same test case based upon the determination in abstract interpretation that the test case is solvable.

11. The system of claim 8, wherein the abstract interpretation includes loading concrete values into the plurality of abstract interpretation models.

12. The system of claim 8, wherein: abstract interpretation is selectively conducted based upon the position of a test case within the code-under-test; and the test case is associated with an intermediate node in the symbolic execution of code-under-test, the intermediate node having children nodes.

13. The system of claim 8, wherein: SMT solving is selectively conducted based upon the position of a test case within the code-under-test; and the test case is associated with a leaf node in the symbolic execution of the code-under-test.

14. The system of claim 8, wherein the processors are further operable to subsequently conduct additional abstract interpretation on the at least one of the test cases upon which abstract interpretation was conducted; wherein the additional abstract interpretation is based on an additional plurality of abstract interpretation models, the additional plurality of abstract interpretation models based upon the same constraints of the test case.

15. An article of manufacture comprising: a non-transitory computer-readable medium; and computer-executable instructions carried on the non-transitory computer-readable medium, the instructions readable by a processor, the instructions, when read and executed, for causing the processor to: determine code-under-test to be evaluated, the code-under-test configured for execution on a computing device; symbolically execute the code-under-test; create a plurality of test cases based on the symbolic execution and including a plurality of constraints; selectively conduct abstract interpretation on at least one of the constraints, the abstract interpretation including using a plurality of abstract interpretation models based on the constraints of the test case and over-approximating the constraints of the test case; selectively conduct Satisfiability Modulo Theory ("SMT") solving on at least one of the constraints; and validate or invalidate the code-under-test based on at least the SMT solving and the abstract interpretation.

16. The article of claim 15, wherein the instructions for causing the processor to conduct abstract interpretation include instructions for causing the processor to: determine a first model based on the constraints of the test case; determine a second model based on the constraints of the test case; determine the intersection of the two models; validate or invalidate the code-under-test based on the presence of elements within the intersection.

17. The article of claim 15, wherein: the abstract interpretation is conducted upon a test case resulting in a determination that the test case is solvable based on the abstract interpretation models; and the SMT solving is selectively conducted upon the same test case based upon the determination in abstract interpretation that the test case is solvable.

18. The article of claim 15, wherein the instructions for causing the processor to conduct abstract interpretation includes instructions for causing the processor to load concrete values into the plurality of abstract interpretation models.

19. The article of claim 15, wherein: abstract interpretation is selectively conducted based upon the position of a test case within the code-under-test; and the test case is associated with an intermediate node in the symbolic execution of code-under-test, the intermediate node having children nodes.

20. The article of claim 15, wherein: SMT solving is selectively conducted based upon the position of a test case within the code-under-test; and the test case is associated with a leaf node in the symbolic execution of the code-under-test.

\* \* \* \* \*